(12) United States Patent
Higuchi

(10) Patent No.: US 8,311,153 B2
(45) Date of Patent: Nov. 13, 2012

(54) CIRCUIT AND METHOD FOR IMPROVED OFFSET ADJUSTMENT OF DIFFERENTIAL AMPLIFIER WITHIN DATA RECEIVING APPARATUS

(75) Inventor: Fujio Higuchi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1113 days.

(21) Appl. No.: 12/230,291

(22) Filed: Aug. 27, 2008

(65) Prior Publication Data
US 2009/0060092 A1 Mar. 5, 2009

(30) Foreign Application Priority Data
Aug. 28, 2007 (JP) ................................. 2007-220643

(51) Int. Cl.
*H03K 9/00* (2006.01)
*H04L 27/00* (2006.01)
(52) U.S. Cl. ........................................ 375/316; 340/442
(58) Field of Classification Search .................. 375/318, 375/316, 373; 340/426.33, 442, 445
See application file for complete search history.

(56) References Cited

U.S. PATENT DOCUMENTS

| 7,285,988 B2 | 10/2007 | Higuchi et al. |
| 7,397,348 B2 | 7/2008 | Iwazumi et al. |
| 2006/0071693 A1* | 4/2006 | Higuchi et al. ............... 327/108 |
| 2006/0079190 A1* | 4/2006 | Ooba et al. ................. 455/226.1 |

FOREIGN PATENT DOCUMENTS

| JP | 2006-107146 A | 4/2006 |
| JP | 2006-109105 A | 4/2006 |

* cited by examiner

*Primary Examiner* — Aristocratis Fotakis
*Assistant Examiner* — Freshteh N Aghdam
(74) *Attorney, Agent, or Firm* — Foley & Lardner LLP

(57) ABSTRACT

A data receiving apparatus is provided to receive command data encoded by using a combination of high-level periods during which there is radio wave and low-level periods during which there is no radio wave. The data receiving apparatus is provided with a receiving circuit including a differential amplifier circuit receiving the command data through an antenna, and a demodulator outputting a reproduced signal corresponding to the command data in response to an output of the differential amplifier; and an offset adjustment switch circuit judging a logic level of the reproduced signal in the low level periods of the command data while the receiving circuit receives the command data, and generates offset switch signals based on the logic level of the reproduced signal in the low level periods. The differential amplifier circuit includes an offset control section adjusting an offset value of the differential amplifier circuit in response to the offset switch signals.

19 Claims, 17 Drawing Sheets

PRIOR ART

PRIOR ART

PRIOR ART

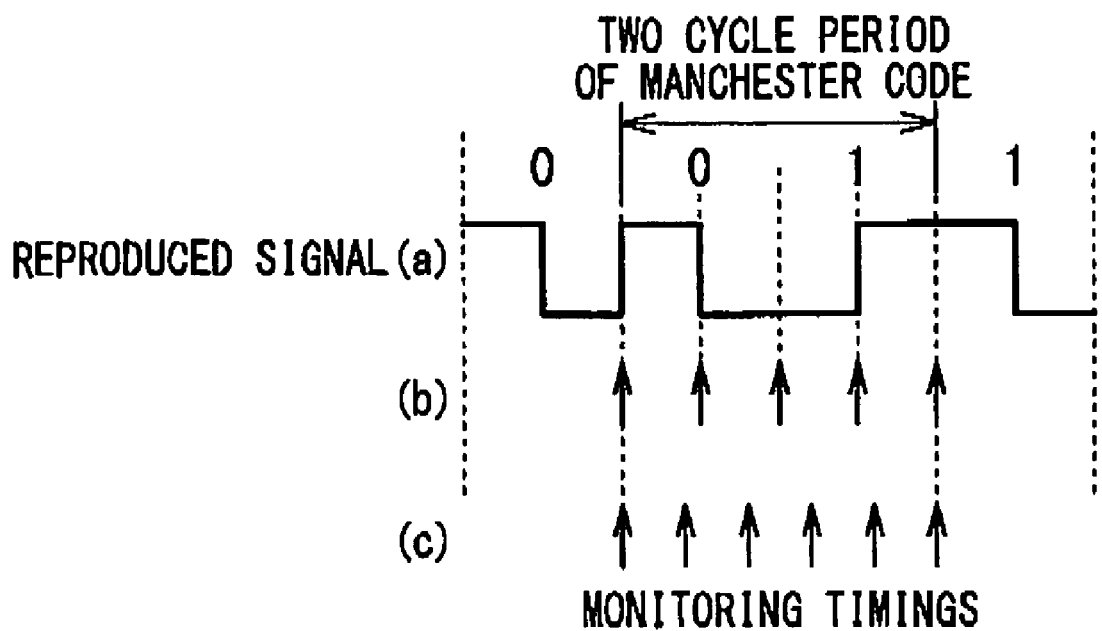

Fig. 13B

| OFFSET SWITCH SIGNAL(S) OF LOW LEVEL | OFFSET DETERMINATION SIGNAL |
|---|---|
| ONLY OFFSET SWITCH SIGNAL S2-1 | L |
| OFFSET SWITCH SIGNALS S2-1 AND S2-2 | H |
| OFFSET SWITCH SIGNALS S2-1 TO S2-3 | H |

CIRCUIT AND METHOD FOR IMPROVED OFFSET ADJUSTMENT OF DIFFERENTIAL AMPLIFIER WITHIN DATA RECEIVING APPARATUS

INCORPORATION BY REFERENCE

This application claims the benefit of priority based on Japanese Patent Application No. 2007-220643, filed on Aug. 28, 2007, the disclosure of which is incorporated herein by reference.

BACKGROUND OF THE INVENTION

1. Field of the Invention

The present invention relates to a data communication system and control method thereof, more specifically, to offset adjustment of a differential amplifier circuit within a data receiving apparatus.

2. Description of the Related Art

Recently, regulations related to vehicle safety have become tightened successively in Japan, the United States, and other countries. The tire pressure monitoring system (TPMS) is one known technique for improving the vehicle safety as disclosed in Japanese Laid Open Patent Application No. P2006-109105A (hereinafter, the '105 application), for example.

FIG. 1 is a schematic illustration showing the structure of the TPMS disclosed in the '105 application. The TPMS includes transmitter modules 111 installed within tires 100, sensor initiators 112, and a receiver module 113. The transmitter modules 111 each include sensors which measures the tire pressure and temperature. The receiver module 113 controls the respective transmitter modules 111 to obtain necessary information related to the tires 100 from the transmitter modules 111. The control of the transmitter modules 111 is achieved by feeding to the respective transmitter modules 111 command data which indicate operations to be done by the transmitter modules 111.

More specifically, the TPMS operates as follows: The receiver module 113 transmits command data to the transmitter modules 111 through the sensor initiators 112. The command data are transmitted with LF (Low Frequency) radio waves. Upon receiving the command data, the transmitter modules 111 measure the pressure and temperature of the respective tires by using the sensors. The transmitter modules 111 transmit measurement result data obtained by the sensors to the receiver module 113 with RF (Radio Frequency) radio waves. The receiver module 113 performs desired operations in response to the received measurement result data, for example, displays information regarding the tire pressure and the sensor on a display device 114.

One requirement is that the transmitter modules 111 receive the command data from the receiver module 113 with high accuracy.

FIG. 2 is a schematic diagram showing the structure of the transmitter modules 111. The transmitter modules 111 each include a microcomputer 120, an LF reception circuit 130, a coil antenna 140, and a reference level generation circuit 150. Provided within the microcomputer 120 are a CPU 122 and a memory 123 which are connected to each other through a bus line 121. The LF reception circuit 130 incorporates therein a damping resistor circuit 131, a comparator 132, a demodulator 133, and a switch SW. The command data are transmitted from the receiver module 113 to each transmitter module 111 with LF radio wave modulated with ASK (Amplitude Shift Keying) modulation. When the command data are transmitted with the LF radio wave, the coil antenna 40 generates an input voltage with LC resonance. The damping resistor circuit 131 includes a damping resistor R1 and the switch SW which are connected between the inputs of the comparator 132. The damping ratio of the input voltage is changeable by the switch SW. The input voltage generated by the coil antenna 140 is fed to the comparator 132. The output signal of the comparator 132 is sent to the demodulator 133 and demodulated thereby to reproduce the command data. The command data reproduced by the demodulator 133 are fed to the microcomputer 120. The microcomputer 120 executes commands incorporated in the reproduced command data.

The '105 application discloses that the comparator 132 within each transmitter module 111 incorporates a MOS transistor pair. Although comparators incorporating a bipolar transistor pair are well known in the art, the use of a bipolar transistor pair within a comparator undesirably requires additional manufacture steps for forming bipolar transistors in addition to manufacture steps for forming MOS transistors within logic circuits; logic circuits are usually comprised of MOS transistors. The use of a MOS transistor pair within the differential amplifier as disclosed in the '105 application effectively avoids the increase in the number of manufacture steps.

One issue of the use of a MOS transistor pair within the comparator 132 is that the characteristics of the two MOS transistors often differ from each other due to manufacture variations. This undesirably causes the offset of the comparator 132. For the case where the input voltage generated by the coil antenna 140 has an amplitude as small as 5 mV, for example, the offset of 5 mV makes it impossible to correctly detect the input voltage.

In order to address this issue, the transmitter modules 111 disclosed in the '105 application include an offset control circuit which adjusts the offset of the comparator 132. FIG. 3 is a block diagram showing details of the comparator 132 of the transmitter modules 111. As shown in FIG. 3, the comparator 132 includes a pair of differential transistors Tr11, Tr12 and an offset control circuit 134. The offset control circuit 134 controls the current supplied from the power supply line VDD to the differential transistor Tr11. The offset control circuit 134 provides adjustment of the balance between the currents through the differential transistors Tr11 and Tr12. This allows adjusting the offset of the comparator 132. Specifically, the offset control circuit 134 includes PMOS transistors (Tr3, Tr5 and Tr7) which function as offset switching switches, and PMOS transistors (Tr4, Tr6, and Tr8) for regulating the current through the differential transistor Tr11. When the offset switching switch PMOS transistors (Tr3, Tr5 and Tr7) are turned ON, currents are supplied to the differential transistor Tr11 from the corresponding current regulating PMOS transistors (Tr4, Tr6, and Tr8). When the number of current paths for supplying currents to the differential transistor Tr11 is increased, the total current amount through the differential transistor is increased (see FIG. 4). It should be noted that the offset control circuit 134 is designed to adjust the current through the differential transistor Tr11 so that the current through the differential transistor Tr11 is smaller than that through the differential transistor Tr12, when the same voltage is applied to the differential transistors Tr11 and Tr12 with all the offset select switches (Tr3, Tr5, Tr7) placed in the OFF state. When the number of the offset switching switches (Tr3, Tr5, Tr7) in the ON-state is increased to increase the total current amount through the differential transistor Tr11, the offset value of the comparator 132 is changed, resulting in that the output of the comparator 132 is switched from the high-level to the low-level at a certain operation point. When the number of the ON-state offset switching switches is adjusted so that the output of the comparator 132 is just switched from the high-level to the low-level, the offset value is set with highest sensitivity. The offset switching switch transistors (Tr3, Tr5, and Tr7) are switched in response to offset switch signals #1, #2 . . . #n received the microcomputer 120.

FIG. 5 is a flowchart showing an exemplary operation in adjusting the offset of the comparator 132. When the CPU 122 of the microcomputer 120 is started up, the microcomputer 120 turns on the switch SW and electrically connects the damping resistor R1 between input terminals of the comparator 132 to provide "low resistance", before starting offset adjustment of the comparator 132. This results in that the voltage between the input terminals of the comparator 132 is sufficiently reduced at Step S101. The microcomputer 120 then sets the offset switching signal #1 to the low-level at Step S102. It should be noted that the offset switch signals. #1 to #n are low-active, and the corresponding offset switching switch transistors are turned on in response the to the pull-down of the offset switch signals #1 to #n. After the offset switching signal #1 is set to the low-level, the output (OUT) of the comparator 132 is monitored at Step S103. Then, the microcomputer 120 sets the offset switching signal #2 to the low-level at Step S104. This is followed by monitoring the output (OUT) of the comparator 132 at Step S105. The same goes for the remaining offset switch signals. Other offset switch signals are successively set to the low-level, followed by monitoring the output of the comparator 132. This process is repeated until the last offset switching signal #n is set to the low-level at Step S106. This is followed by determining the offset switch signal which causes the output of the comparator 132 to be just switched from the high-level to the low-level at Step S107. The state of the offset switch signals #1 to #n which just switch the output of the comparator 132 from the high-level to the low-level is the state where the offset is minimized. The state of the offset switch signals determined at Step S107 is saved in the memory 123. Then, the microcomputer 120 turns off the switch SW and thereby disconnects the damping resistor R1 from the input terminals of the comparator 132 at Step S108 to prohibit damping of the input voltage in normal operations.

The above described structure and operations of the transmitter module 111 allows minimizing the offset value of the comparator 132, allowing operating the transmitter module 111 with high sensitivity.

Another requirement for a tire pressure monitoring system is to reduce power consumption of the transmitter modules 111. The transmitter modules 111 of a TPMS are installed within the tires 100 so that the battery thereof cannot be exchanged for a long time. Thus, the power consumption of the transmitter modules 111 is desirably reduced in order to allow the battery to operate for a long time. Japanese Laid Open Patent Application No. P2006-107146A discloses that an intermittent operation control circuit for allowing the LF reception circuit to operate intermittently.

The technique disclosed in the '105 application, however, suffers from a drawback that the offset of the comparator 132 may be adjusted inappropriately, when the offset adjustment is performed while the antenna 140 receives radio wave. The microcomputer 120 is booted in response a startup signal from a startup control circuit, and then starts the offset adjustment. The offset adjustment is performed regardless of whether or not the antenna is receiving radio wave. When the offset adjustment is performed while the antenna 140 is receiving the radio wave, the offset value after the offset adjustment may be shifted from a desired value depending on the amplitude of the input voltage generated at the antenna 140. A detailed description is given of the reason thereof in the following.

The graph in the left region of FIG. 6 shows an example of the offset adjustment for the case where no LF radio wave is received, assuming that the offset value is changed by 1 mV when one offset switching switch is switched. It should be noted that the offset value is the difference between the voltage levels of the inverting and non-inverting inputs which causes the output of the comparator 132 is switched between the high-level and the low-level. When the number of turned-on offset switching switches is increased by one while the LF radio wave is not received, the offset value is increased by 1 mV. The case (1) shown in FIG. 6 is a case where the offset value is −1 mV with two offset switching switches turned on. For the case (1), the offset value is adjusted to exactly zero, by increasing the number of the turned-on offset switching switches up to three. When the number of the turned-on offset switching switches is increased up to four, the offset value is increased up to 1 mV. When the number of the turned-on offset switching switches is increased up to four, the output of the comparator is switched from the high-level to the low-level. Therefore, the state of the offset switch signals #1 to #n at this moment is determined as providing the minimum offset value at Step S107 of the procedure shown in FIG. 5. On the other hand, the cases (2) and (3) are cases where the offset value is not adjusted to exactly 0 even if the number of the turned-on offset switching switches is best adjusted. In the cases (2) and (3), the offset value cannot be adjusted to exactly 0 even if the number of turned-on offset switching switches is successively incremented one by one. However, the offset value certainly falls within a range between 0 and 1 mV with a certain number of turned-on offset switching switches. At Step S107, the state in which the offset value is within the range between 0 and 1 mV is determined as the state that provides the minimum offset value.

The right region of FIG. 6, on the other hand, shows the offset adjustment for the case where LF radio wave is received. It is assumed here that the potential difference between the inverting and non-inverting inputs of the comparator 132 generated by the radio wave is 2 mV at the maximum. In FIG. 6, the line (4) indicates the voltage level on the non-inverting input of the comparator 132. The line (5) corresponds to the state where the offset value is 1 mV, showing the value obtained by adding 1 mV to the voltage level on the inverting input terminal of the comparator. The line (6) corresponds to the state where the offset value is 2 mV, showing the value obtained by adding 2 mV to the voltage level on the inverting input of the comparator. The line (5) goes below the line (4) in the hatched areas. This implies that the voltage applied to the non-inverting input exceeds the value obtained by adding 1 mV to the voltage level on the inverting input. In such state, the output of the comparator 132 is pulled up to the high-level. Therefore, the output of the comparator 132 is misjudged as the high-level at timings indicated by the hatched areas, although the offset value is actually a positive value. In this case, the state with the offset value of +1 mV is not determined as offering the minimum offset value at Step S107 shown in FIG. 5. Such a phenomenon where the output of the comparator 132 which is actually the low-level is misjudged as the high-level may occur in the range where the offset value is +2 mV (indicated by the line (6)) or less. Therefore, an adjustment error of about 2 mV may be generated at the maximum. This phenomenon is enhanced as the amplitude of the input voltage generated by the radio wave is increased. This implies that the radio wave cannot be demodulated even if the radio wave provides the input voltage with an amplitude of 2 mV, necessitating the input of radio wave with a larger amplitude.

As thus discussed, the technique disclosed in the '105 application requires adjusting the offset value under a state in which the radio wave is not received, in order to accurately set the offset value.

It is therefore desired to provide a technique for performing offset adjustment accurately whether or not the antenna is receiving radio wave.

SUMMARY

In an aspect of the present invention, a data receiving apparatus is provided to receive command data encoded by using a combination of high-level periods during which there is radio wave and low-level periods during which there is no radio wave. The data receiving apparatus is provided with a receiving circuit including a differential amplifier circuit receiving the command data through an antenna, and a demodulator outputting a reproduced signal corresponding to the command data in response to an output of the differential amplifier; and an offset adjustment switch circuit judging a logic level of the reproduced signal in the low level periods of the command data while the receiving circuit receives the command data, and generates offset switch signals based on the logic level of the reproduced signal in the low level periods. The differential amplifier circuit includes an offset control section adjusting an offset value of the differential amplifier circuit in response to the offset switch signals.

In the device thus constructed, the offset adjustment switch circuit generates offset switch signals on the basis of the logic level of the reproduced signal in the low-level periods of the command data in adjusting the offset value of the differential amplifier circuit. In the low-level periods, the state of the reproduced signal is virtually same as the state in which the command data are not received. This allows the offset adjustment switch circuit to adjust the offset value during the reception of the command data in the same way as the case where the command data are not received. In other words, the data receiving apparatus of this invention achieves accurate offset adjustment regardless of whether or not command data are being received.

In another aspect of the present invention, an offset adjustment method includes: receiving command data through an antenna by a receiving circuit, the command data being encoded by using a combination of high-level periods during which there is radio wave and low-level periods during which there is no radio wave; reproducing the received command data by the receiving circuit to output a reproduced signal; and adjusting an offset value of a differential amplifier circuit within the receiving circuit. The adjusting includes: judging a logic level of the reproduced signal in the low level periods of the command data while the receiving circuit receives the command data; and determining the offset value of the differential amplifier circuit based on a result of the judging.

This method allows adjusting the offset value during the reception of the command data in the same way as the case where the command data are not received, since, in the low-level periods, the state of the reproduced signal is virtually same as the state in which the command data are not received.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 12 is a timing chart for illustrating timings for monitoring a reproduced signal;

FIG. 13B is a conceptual diagram showing data stored in an offset storage unit;

DESCRIPTION OF PREFERRED EMBODIMENTS

Figure 1:
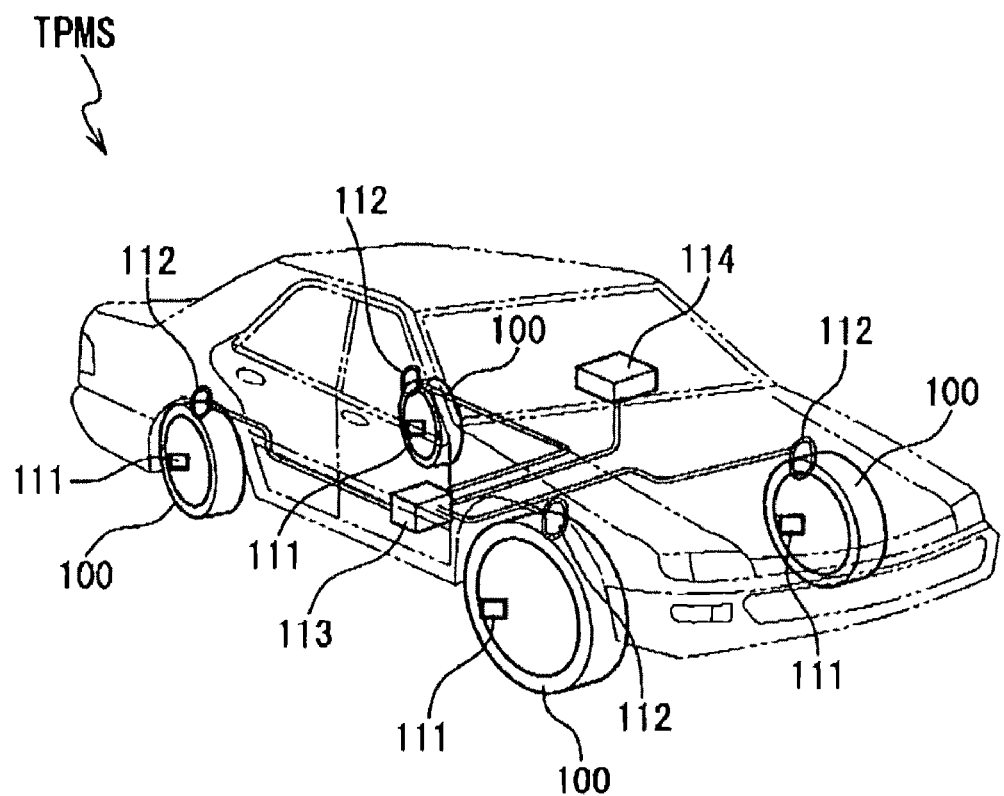
FIG. 1 is a schematic block diagram showing a structure of a conventional tire pressure measuring system (TPMS)
Figure 2:
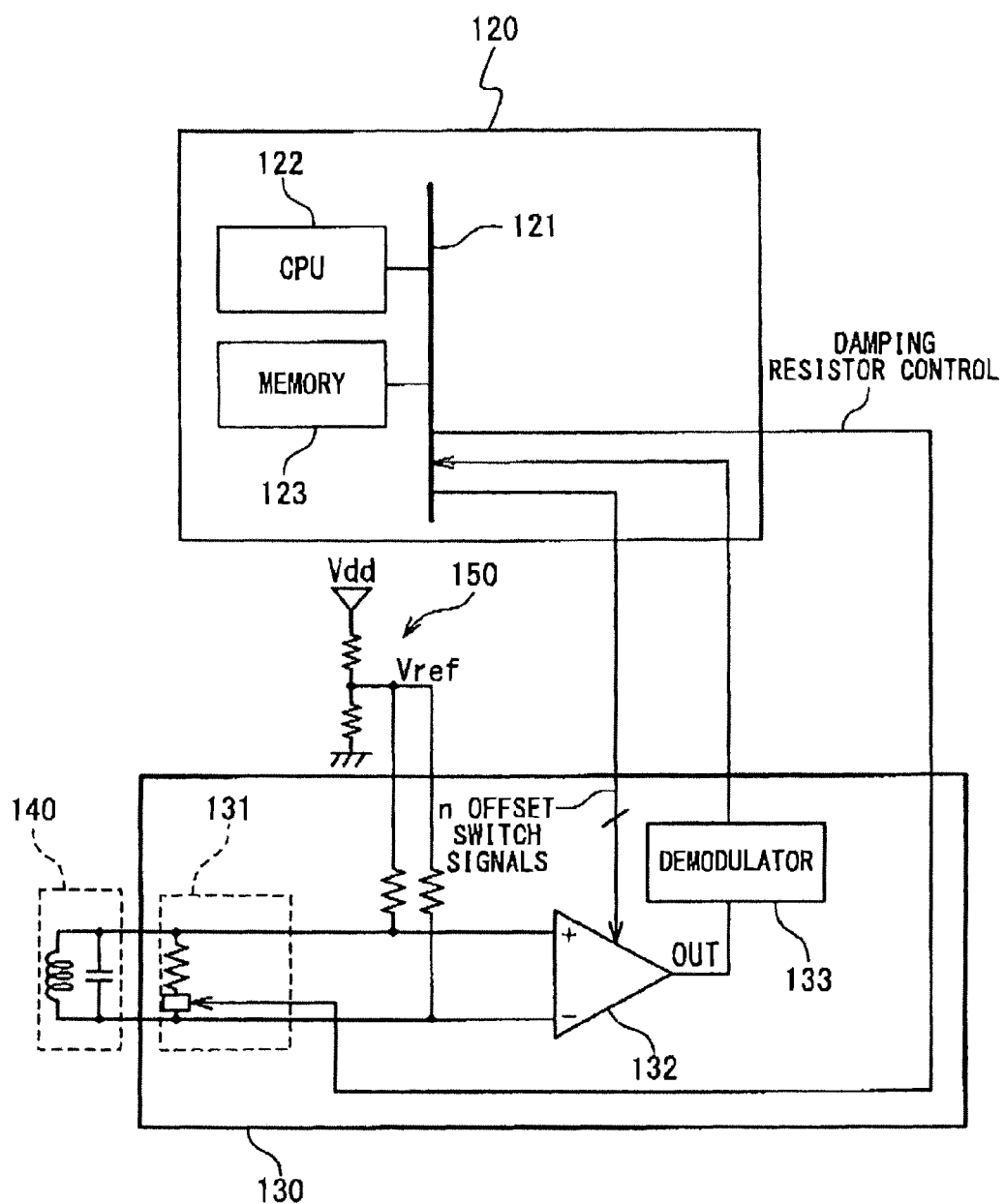
FIG. 2 is a schematic block diagram showing a structure of a conventional transmitter module.
Figure 3:
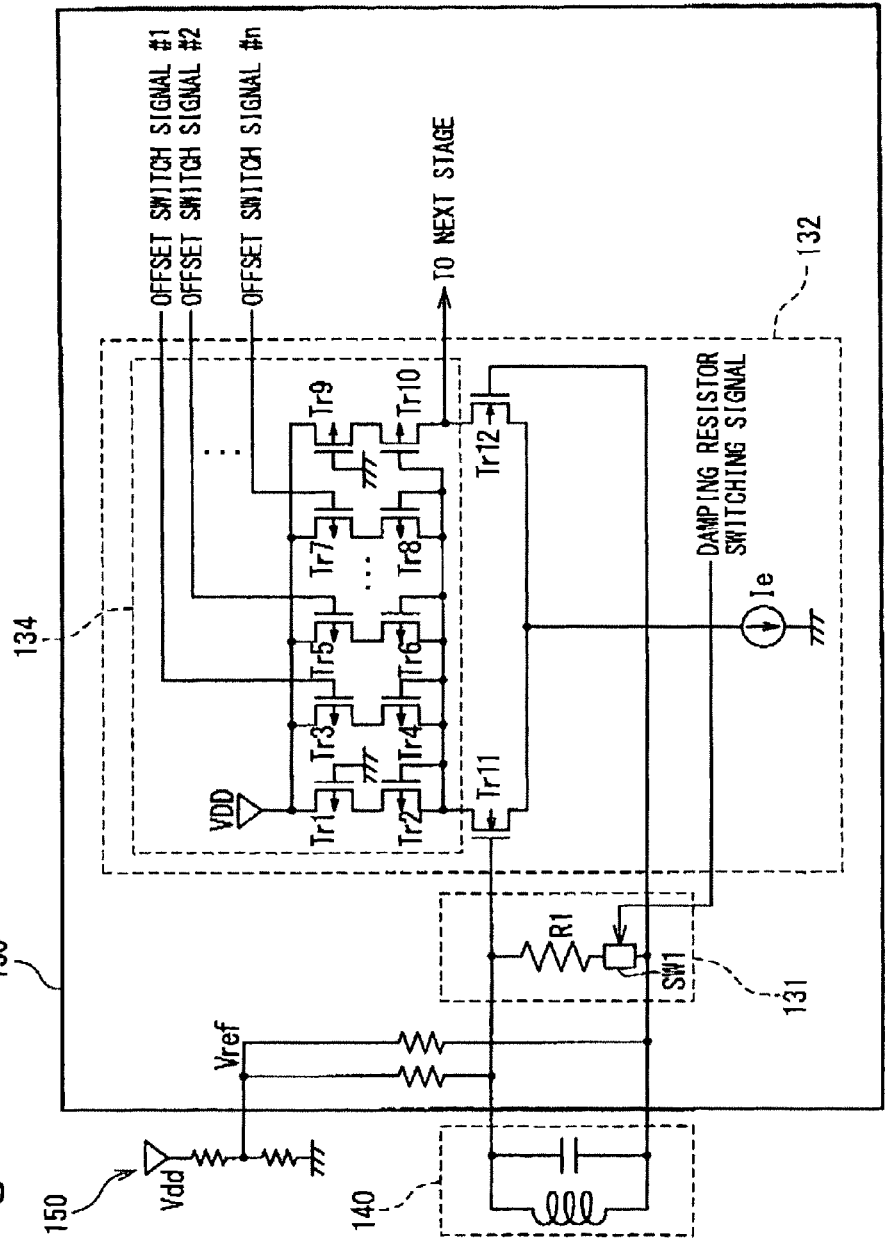
FIG. 3 is a schematic circuit diagram showing the structure of the conventional transmitter module.
Figure 4:
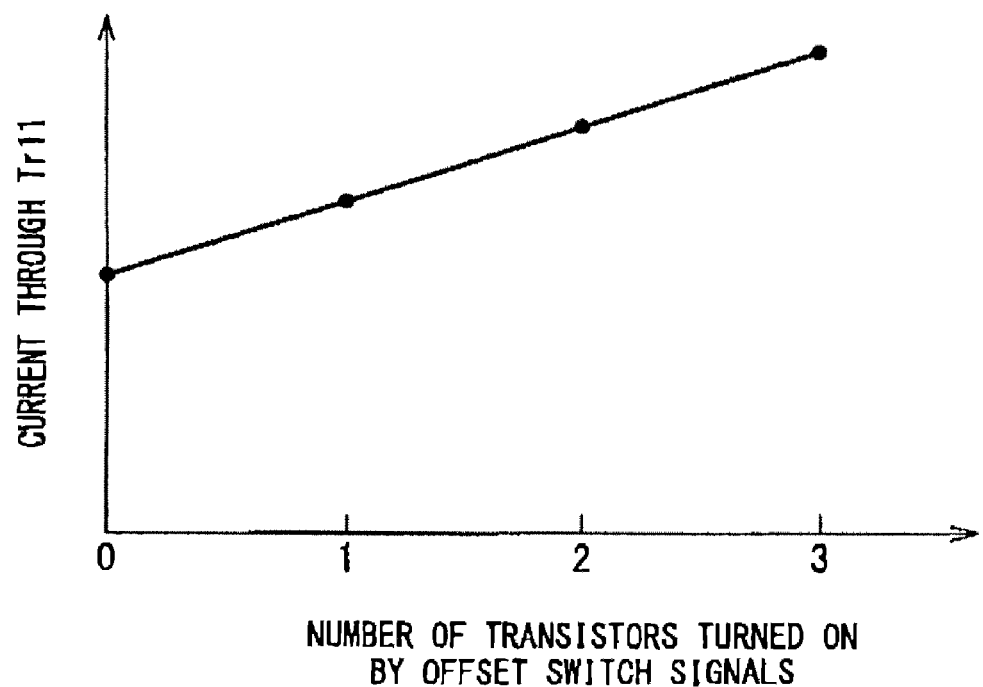
FIG. 4 is a graph showing a relation between the current level through the transistor Tr11 and the number of transistors turned on in the conventional TPMS.
Figure 5:
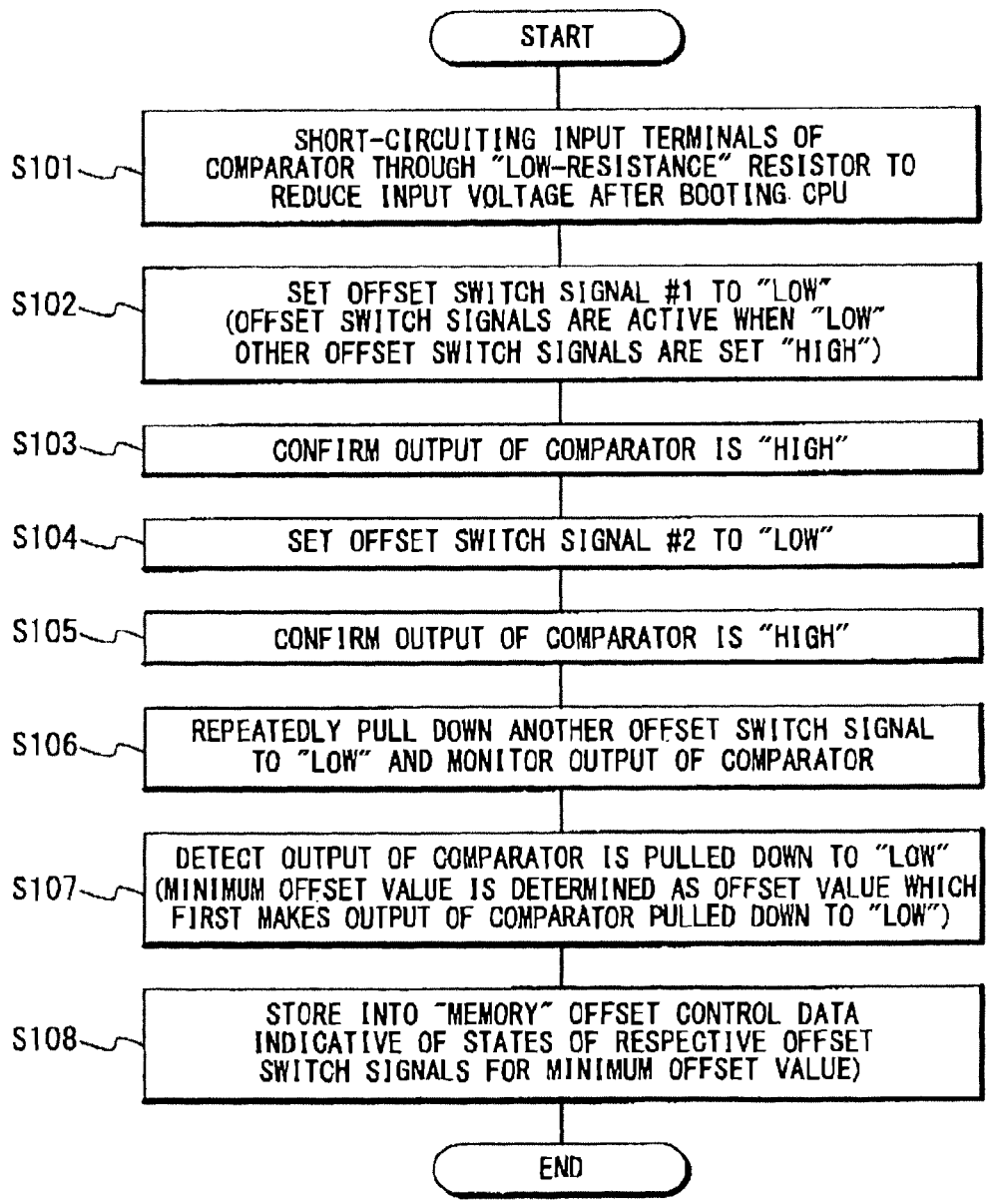
FIG. 5 is a flowchart showing an offset adjustment procedure for a conventional comparator.
Figure 6:
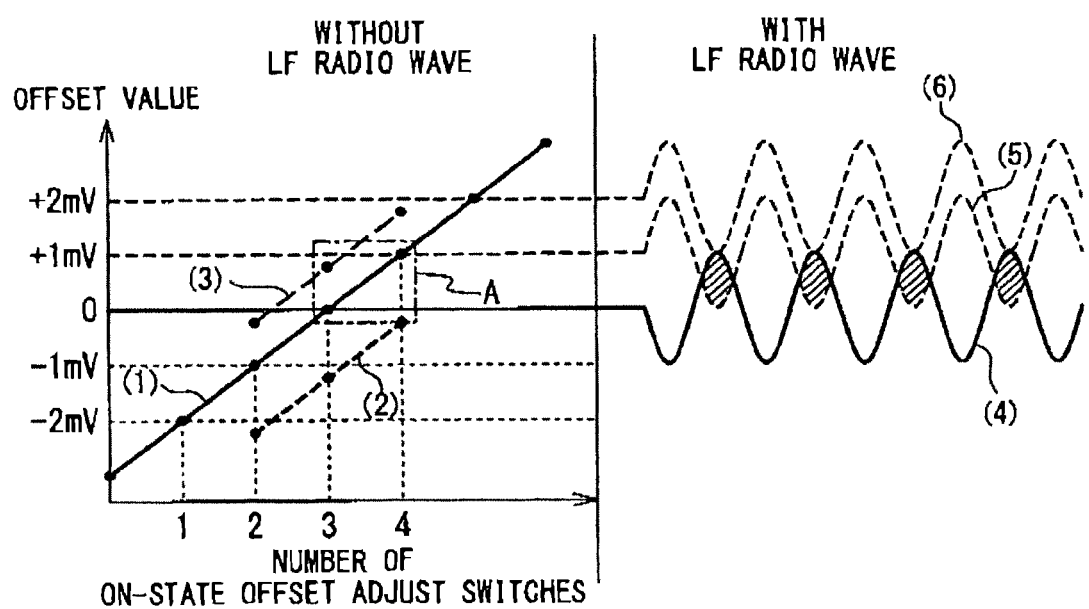
FIG. 6 illustrates the state where offset adjustment is performed within the conventional transmitter module during the reception of radio wave.

The invention will be now described herein with reference to illustrative embodiments. The embodiments described below are directed to a data communication system used in a TPMS, as shown in FIG. 1, for example. However, those skilled in the art will recognize that many alternative embodiments can be accomplished using the teachings of the present invention and that the invention is not limited to the embodiments illustrated for explanatory purposes. It should be especially noted that the present invention is not limited to a data communication system used in a TPMS.

Figure 7:
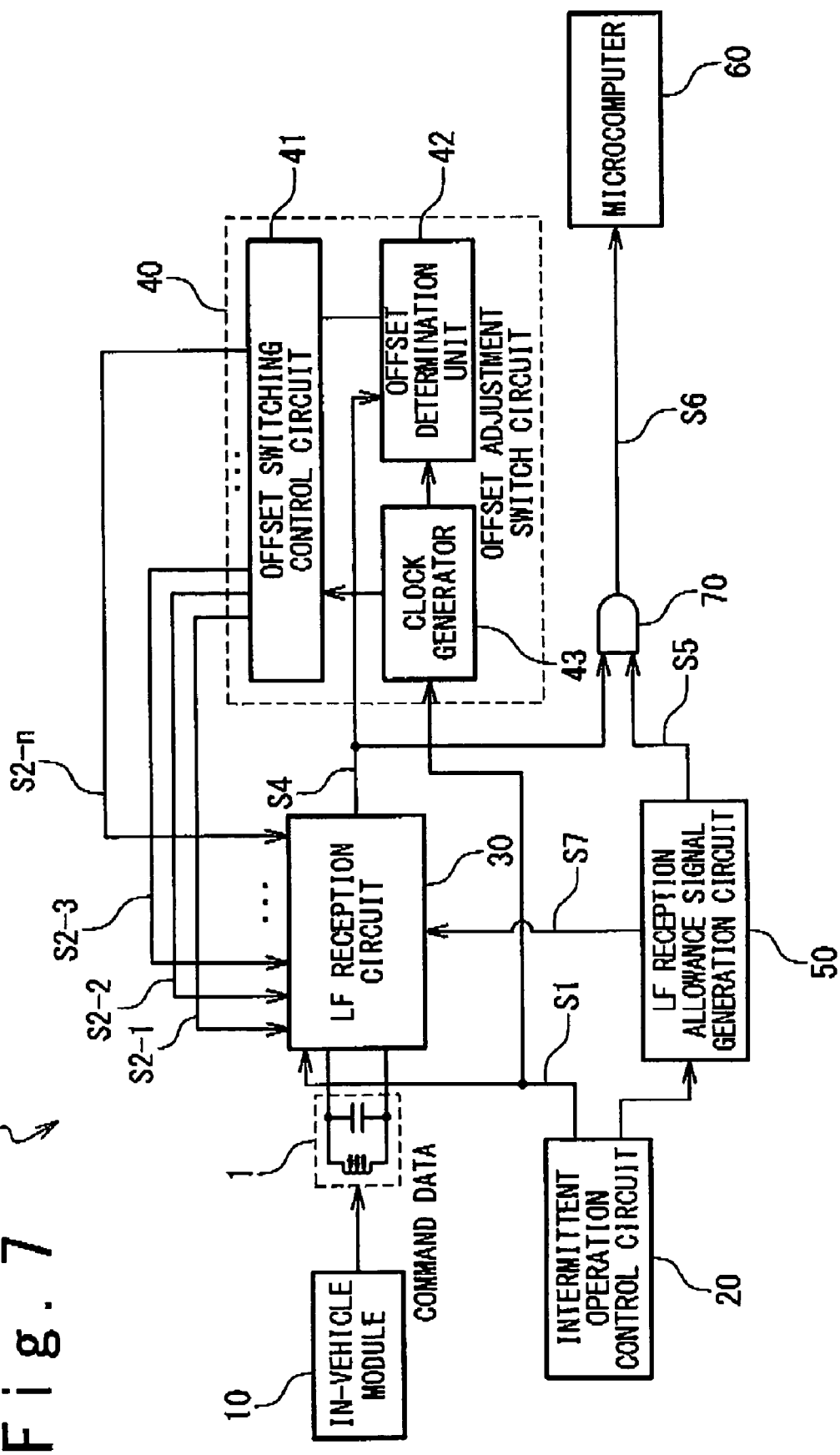
FIG. 7 is a schematic block diagram showing a structure of a data communication system in one embodiment of the present invention.

FIG. 7 is a block diagram showing the overall structure of a data communication system in one embodiment of the present invention. The data communication system of this embodiment includes a receiver module 10 (or in-vehicle module) mounted on a vehicle body, and a transmitter module (or in-tire module) 11 mounted within a tire wheel of the vehicle. Although only one transmitter module 11 is shown in FIG. 7, those skilled in the art would appreciate that transmitter modules 11 are prepared for tire wheels of the vehicle, respectively. This embodiment is mainly directed to data communication from the receiver module 10 to the transmitter module 11. Therefore, the receiver module 10 may be referred to as the data transmitting apparatus 10, and the transmitter module 11 may be referred to as the data receiving apparatus 11, hereinafter.

The data receiving apparatus 11 includes an antenna 1, an intermittent operation control circuit 20, an LF reception circuit 30, an offset adjustment switch circuit 40, an LF reception allowance signal generation circuit 50, a microcomputer 60, and an interruption generation unit 70.

Schematically, the data communication system of this embodiment operates as follows. The data transmitting apparatus 10 transmits command data to the data receiving apparatus 11 with LF radio wave. The data receiving apparatus 11 receives the command data with the antenna 1. The LF reception circuit 30 reproduces the received command data to generate a reproduced signal S4. The reproduced signal S4 is fed to the interruption generation unit 70. When an LF reception allowance signal is activated (this will be described later in detail), the interruption generation unit 70 activates an interruption signal 56 fed to the microcomputer 60. The logic level of the interruption signal S6 at this moment is set identical to that of the reproduced signal S4. Therefore, the same operation is implemented as the case the reproduced signal S4 is directly supplied to the microcomputer 60. The microcomputer 60 executes a command indicated by command data in response to the interruption signal 56.

The data receiving apparatus 11 of the data communication system shown in FIG. 7 is operated intermittently by the intermittent operation control circuit 20. That is, the intermittent operation control circuit 20 activates an intermittent operation signal S1 fed to the LF reception circuit 30, the offset adjustment switch circuit 40, and the LF reception allowance signal generation circuit 50, at given time intervals. The LF reception circuit 30 is started up when the intermittent operation signal S1 is activated. Further, the offset adjustment switch circuit 40 adjusts an offset value of the LF reception circuit 30, when the intermittent operation signal S1 is activated. When the offset adjustment switch circuit 40 completes adjustment of the offset value, the LF reception allowance signal generation circuit 50 activates the LF reception allowance signal S5 fed to the interruption generation unit 70. As described above, the interruption generation unit 70 activates the interruption signal S6 fed to the microcomputer 60, when receiving the reproduced signal S4 generated from the command data from the LF reception circuit 30 with the LF reception allowance signal S5 activated. The microcomputer 60 is started up in response to the activation of the interruption signal S6, and executes commands described in the command data reproduced in the reproduced signal S4. The microcomputer 60 executes the commands of the reproduced signal S4 after the offset value of the LF reception circuit 30 is adjusted.

Hereinafter, a detailed description is given of structures and operations of respective circuit portions in the data communication system of this embodiment.

The receiver module 10 (data transmitting apparatus) transmits the command data incorporating commands, such as a command instructing measurement of the tire temperature and a command instructing measurement of the tire pressure, by LF (Low Frequency) radio wave. The command data are transmitted irregularly, in response to a door being opened, or in response to an instruction by a user, for example.

The command data transmitted by the receiver module 10 are encoded with a Manchester coding. The Manchester coding is an encoding method for serial transmission, and employed in the Ethernet system, which is standardized as IEEE 802.3. The command data are generated by the data transmitting apparatus 10 through ASK (Amplitude Shift Keying) modulation, for example, and transmitted by radio wave.

Figure 8:
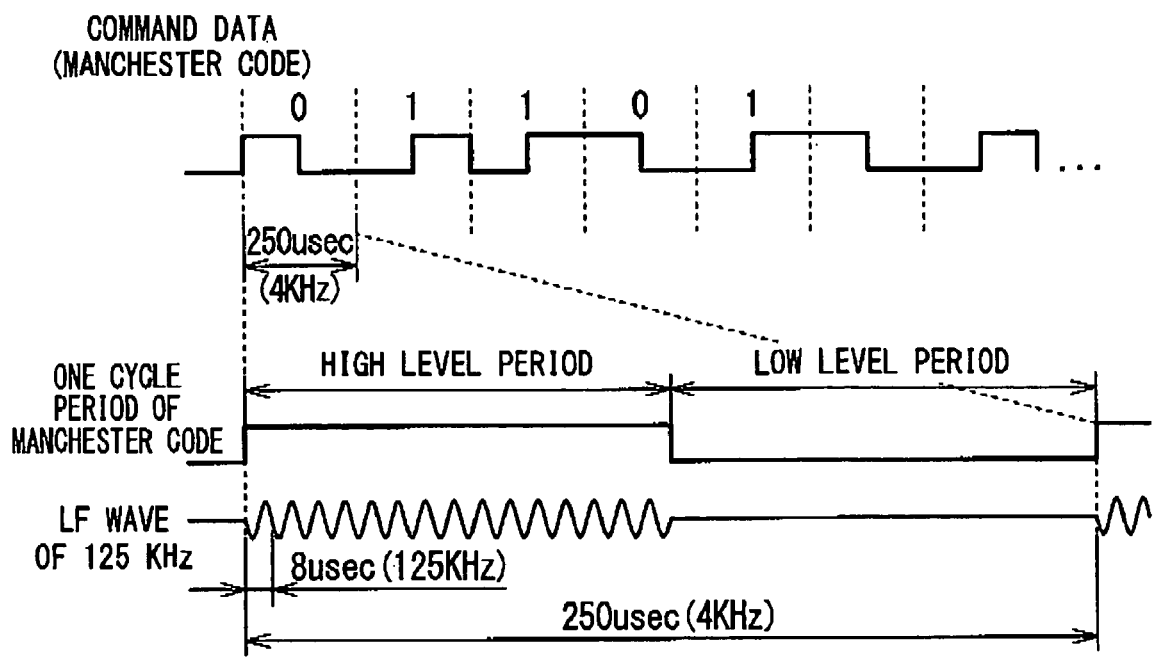
FIG. 8 is a timing chart illustrating the coding of command data according to the present invention.

In the following, the Manchester coding of the command data will be described with reference to FIG. 8. In this embodiment, encoding of the command data by the Manchester coding is implemented as binary data coding which uses two symbols: one represents "0" and the other represents "1". FIG. 8 shows an example of command data of "01101" coded with the Manchester coding. The data transmission rate of the command data shown in FIG. 8 is 4 (KHz), and the duration of one cycle is 250 µsec. Note here that one cycle of the command data is not defined as the time required for transmitting the complete sequence of the command data of "01101", but as the time required for transmitting each symbol which represents "0" or "1".

In this embodiment, data "0" and "1" are represented by combination of a "high-level" period and a "low-level" period. As shown in FIG. 8, the "high-level" period is defined as a period during which LF radio wave is generated, and the "low-level" period is defined as a period during which LF radio wave is not generated. In one embodiment, the LF radio wave has a frequency of 125 kHz (that is, a cycle of 8 µsec). A symbol is defined as representing data "0" (or CD0) when the former half of one cycle is the "high-level" period and the latter half is the "low-level" period, and defined as representing data "1" (or CD1) when the former half of one cycle is the "low-level" period and the latter half is the "high-level" period.

Therefore, the command data encoded with the Manchester coding described-above necessarily incorporates a "low-level" period for each symbol. Further, the command data are repeatedly transmitted during a command data transmission period.

Although the present embodiment is described as a case when the command data are encoded with the Manchester coding, the command data may be encoded by a method other than the Manchester coding, which encodes the command data in such a manner that each symbol of the command data essentially includes a low-level period regardless of the value of the symbol.

A description is given next of the structure of the data receiving apparatus 11 with reference to FIG. 7. As described above, the data receiving apparatus 11 includes the antenna 1, the intermittent operation control circuit 20, the LF reception circuit 30, the offset adjustment switch circuit 40, the LF reception allowance signal generation circuit 50, the microcomputer 60, and the interruption generation unit 70.

The intermittent operation control circuit 20 allows operating the data receiving apparatus 11 intermittently to suppress the power consumption. The intermittent operation control circuit 20 activates the intermittent operation signal S1, which is fed to the LF reception circuit 30, the offset adjustment switch circuit 40, and the LF reception allowance signal generation circuit 50, at given time intervals. The data receiving apparatus 11 is operated only while the intermittent operation signal S1 is activated, so that it does not consume the power while the intermittent operation signal S1 is not activated. The intermittent operation of the data receiving apparatus 11 effectively reduces the power consumption thereof. In this embodiment, the power used in the data receiving apparatus 11 is fed wholly from a battery (not shown) that is connected to the data receiving apparatus 11. A data receiving apparatus incorporated within a tire wheel, which performs tire pressure measurement, signal processing, radio transmission and so on, is required to be small in size and light in weight for not affecting the tire balance.

Therefore, a button battery or the like is practically used in such a data receiving apparatus in terms of the cost. Further, the battery needs to be securely connected to the circuit of the data receiving apparatus 11 so as not to be disconnected easily due to the vibratory motion during driving, and therefore the battery normally remains unexchanged until the tire wheel is exchanged. Due to such use conditions, the data receiving apparatus 11 of the TPMS requires low power consumption in addition to high sensitivity. It is especially advantageous to operate the data receiving apparatus 11 intermittently as in the case of this embodiment when it is applied to a case such as TPMS where low power consumption is particularly required.

The command data are transmitted irregularly, and therefore the data receiving apparatus may not be able to receive the command data, not operated during the transmission of the command data, if the intervals of the activation of the intermittent operation signal S1 are too long. As mentioned above, the command data are repeatedly transmitted during a command data transmission period. The data receiving apparatus 11 only needs to receive command data at least once, which are repeatedly transmitted during the command data transmission period. In order to surely receive the command data, the duration of the command transmission period is set longer than the cycle period of the intermittent operation signal S1. More specifically, the duration of the command transmission period is set longer than the sum of the cycle of the intermittent operation signal S1 and the duration of each period during which the intermittent operation signal S1 is activated.

Figure 9:
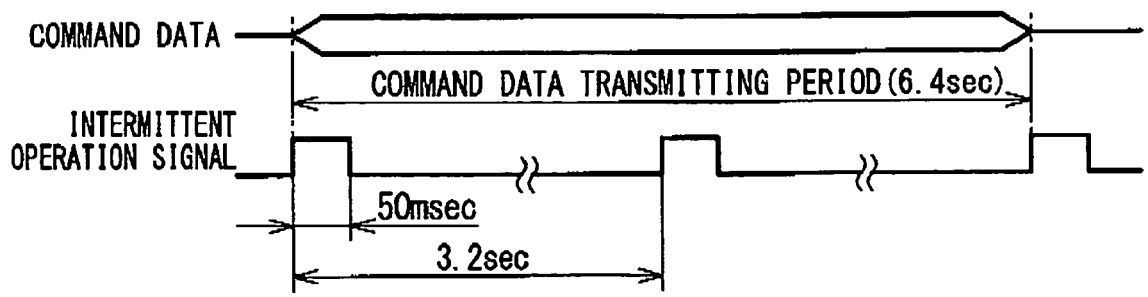
FIG. 9 is a timing chart showing a relation between the reception of the command data and an intermittent operation signal according to the present invention.

FIG. 9 is an example showing timings at which the intermittent operation signal S1 is activated within a command data transmission period. In the case of FIG. 9, the duration of the command data transmission period is 6.4 sec, and the cycle of the intermittent operation signal s1 is 3.2 sec. Further, the duration of the activation of the intermittent operation signal S1 is 50 msec. Note here that the command transmission period (6.4 sec) is longer than the sum (3.2 sec+50 msec) of the cycle (3.2 sec) of the intermittent operation signal S1 and the duration of the period (50 msec) during which the intermittent operation signal S1 is activated. The intermittent operation signal S1 is activated at least once in each command data transmission period regardless of the timing at which the command data are transmitted. This ensures the reception of the command data.

The intermittent operation control circuit 20 may be configured in accordance with a known technique (see Japanese Laid Open Patent Publication No. P2006-107146A, for example).

Figure 10:
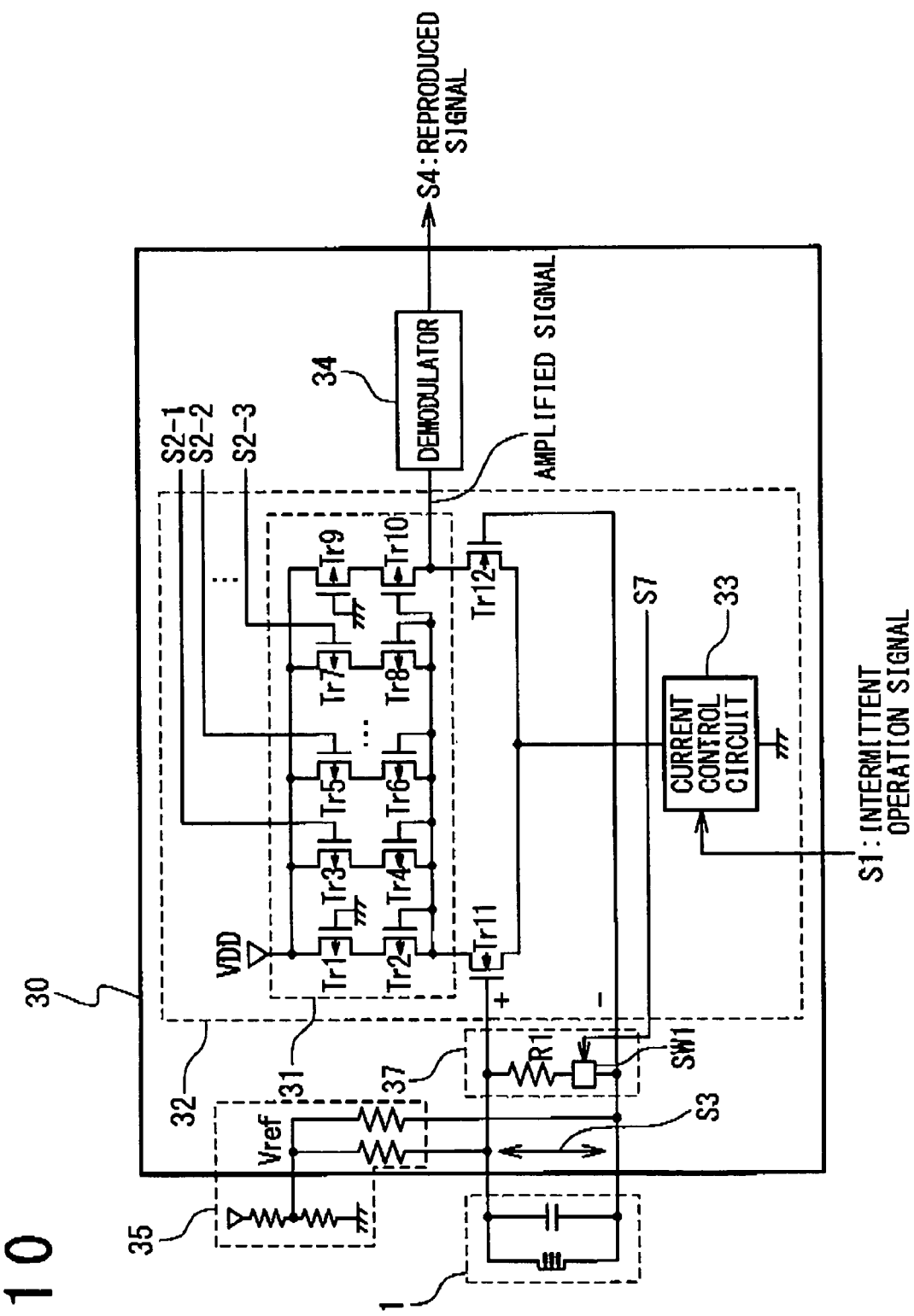
FIG. 10 is a schematic block diagram showing a structure of an LF reception circuit according to the present invention.

A description is given next of structures of the antenna 1 and the LF reception circuit 30. FIG. 10 is a block diagram showing exemplary structures of the antenna 1 and the LF reception circuit 30. The LF reception circuit 30 includes a comparator 32 (differential amplifier circuit), a demodulator 34, a reference level generation circuit 35, and a damping resistance circuit 37.

The antenna 1 receives the command data transmitted by the LF radio wave to generate an input signal S3. In this embodiment, the antenna 1 is an LC resonance antenna incorporating a coil L and a capacitor C connected in parallel. One end of the antenna 1 is connected to the non-inverting input of the comparator 32, and the other of the antenna 1 is connected to the inverting input of the comparator 32. When the command data are transmitted by the LF radio wave, the antenna 1 generates a voltage between the ends thereof by self-excited resonance. The generated voltage is supplied to the comparator 32 as the input signal S3.

The reference level generation circuit 35 supplies a reference voltage Vref to the non-inverting and inverting inputs of the comparator 32. The reference level generation circuit 35 is connected to nodes disposed between the comparator 32 and the antenna 1. When the input signal S3 corresponding to the command data is not generated across the antenna 1, the reference voltage Vref is fed to both of the non-inverting and inverting inputs of the comparator 32.

The damping resistance circuit 37 is provided to adjust the damping ratio of the antenna 1. The damping resistance circuit 37 includes a damping resistance R1 and a switch SW1. The damping resistance circuit 37 is provided between the non-inverting and inverting inputs of the comparator 32. When the switch SW1 is turned off, the damping ratio of the antenna 1 is reduced. When the switch SW1 is turned on, on the other hand, the damping ratio is increased, and the electromotive force for generating the input signal S3 through the LC self-excited resonance is suppressed. Further, the turn-on of the switch SW1 provides low resistance between the non-inverting and inverting inputs of the comparator 32 to short-circuit the non-inverting and inverting inputs. The switch SW1 is connected to the LF reception allowance signal generation circuit 50. The switch SW1 is turned off when a damping resistance control signal S7 received from the LF reception allowance signal generation circuit 50 is deactivated. On the other hand, the switch SW1 is turned on, when the LF reception circuit 30 is being operated and the damping resistance control signal S7 is deactivated.

The comparator 32 detects the voltage between the non-inverting and inverting inputs thereof to generate an amplified signal. When the voltage level of the non-inverting input with respect to the inverting input is equal to or larger than an offset value (the threshold value), the comparator 32 set the output signal (or the amplified signal) to the high-level. When the voltage level of the non-inverting input with respect to the inverting input is smaller than the offset value (threshold value), the comparator 32 set the output signal to the low-level. It should be noted that, in this embodiment, the offset value is defined as the voltage between the non-inverting and inverting inputs (that is, the voltage level of the non-inverting input minus the voltage level of the inverting input) at which the output of the comparator 32 is switched between the low-level and the high-level.

The demodulator 34 is connected to the comparator 32. The demodulator 34 reproduces command data from the amplified signal generated by the comparator 32, and outputs the reproduced command data as the output of the LF reception circuit 30. The output of the LF reception circuit 30 may be referred to as the reproduced signal S4, hereinafter.

Figure 11:
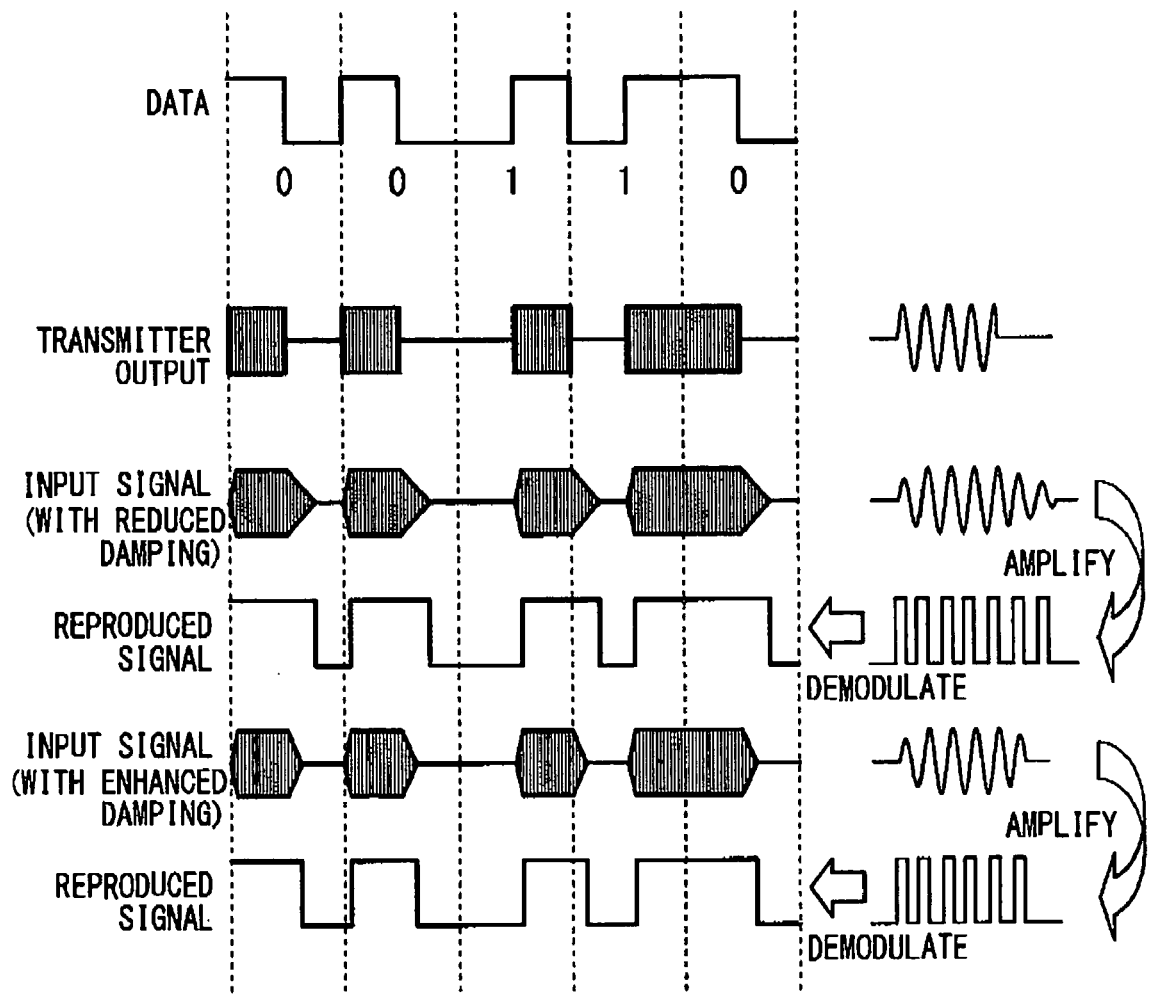
FIG. 11 is a timing chart illustrating waveforms of signals processed in the LF reception circuit.

FIG. 11 is a timing chart for illustrating operations from the timing when the LF radio wave is received by the antenna 1 to the timing when the LF radio wave is demodulated by the demodulator 34 to reproduce the command data. The right portion of FIG. 11 shows the waveforms of the LF radio wave, the input signal S3, the amplified signal, and the reproduced signal S4, for easy understanding.

Let us consider a case when command data of "00110" encoded with the Manchester coding are transmitted as shown in FIG. 11. Each symbol incorporates a "high-level" period during which there is LF radio wave, and a "low-level" period during which there is no LF radio wave (see the waveform of "transmitter output" in FIG. 11). When the LF radio wave is transmitted during the high-level period, the antenna 1 generates the input signal S3 by self-excited resonance. When the switch SW1 within the damping resistance circuit 37 is set off to reduce the damping ratio, the amplitude of the input signal S3 is increased in generating the input signal S3, and the damping time is also increased (see the waveform of "input signal (with reduced damping)" in FIG. 11). When the switch SW1 is set on to increase the damping ratio, the amplitude of the input signal S3 is reduced and the damping time is also reduced compared to the case where the damping ratio is low (see "input signal (with reduced damping)" in FIG. 11). The input signal S3 generated by the antenna 1 is fed to the comparator 32. The comparator 32 provides differential amplification of the input signal S3 to generate a square wave signal as the amplified signal. The amplified signal is fed to the demodulator 34. The demodulator 34 identifies high-level periods in the command data on the basis of the amplified signal, and reproduces the command data. The demodulator 34 outputs the reproduced signal S4 incorporating the command data.

Referring back to FIG. 10, the structure of the comparator 32 is then described in details. The comparator 32 includes a current control circuit 33, an offset control circuit 31, and a pair of differential transistors Tr11 and Tr12.

The differential transistors Tr11 and Tr12 are both NMOS transistors. The gates of the differential transistors Tr11 and Tr12 are used as the non-inverting input and the inverting input of the comparator 32, respectively. The drains of the differential transistors Tr11 and Tr12 are connected to the power supply line VDD through the offset control circuit 31. The voltage generated on the drain of Tr12 is supplied to the demodulator 34 as the amplified signal.

The current control circuit 33 is connected to sources of the differential transistors Tr11 and Tr12. Further, the current control circuit 33 is connected to the intermittent operation control circuit 20. The current control circuit 33 is started up in response to the activation of the intermittent operation signal S1 fed from the intermittent operation control circuit 20, and operates to provide a constant current from the differential transistors Tr11 and Tr12 to the earth.

The offset control circuit 31 is configured to control the offset value of the comparator 32. The offset control circuit 31 adjusts the offset value by adjusting the balance of the currents fed to the drains of the differential transistors Tr11 and Tr12. If the offset control circuit 31 is not provided, it is necessary to form the differential transistors within the comparator without variations in the characteristics thereof in the manufacture. It is difficult to form the differential transistors without variations in the characteristics when the size of the comparator is reduced. The offset control circuit 31, which provides adjustment of the offset value for the comparator 32, effectively avoids the problem of the variations between the characteristics of the differential transistors caused by the manufacture. Therefore, the use of the offset control circuit 31 allows easily reducing the size of the differential transistors and thereby reducing the size of the comparator 32.

The offset value of the comparator 32 is determined depending on the state of the offset control circuit 31. Therefore, the state of the offset control circuit 31 may be referred to as the "offset state" in the following.

The offset control circuit 31 is provided between the power supply line VDD and the drains of the differential transistors Tr11 and Tr12. The offset control circuit 31 includes ten transistors Tr1 to Tr10. The transistors Tr1 to Tr10 are all PMOS transistors. The power supply line VDD is connected to the sources of the transistors Tr1, Tr3, Tr5, Tr7, and Tr9, The sources of the transistors Tr2, Tr4, Tr6, Tr8, and Tr10 are connected to the drains of the transistors Tr1, Tr3, Tr5, Tr7, and Tr9. The drains of the transistors Tr2, Tr4, Tr6, and Tr8 are connected to the drain of differential transistor Tr11 and the gate of the transistor Tr10. The drain of the transistor Tr10 is connected to the drain of the differential transistor Tr12.

The transistors Tr1 and Tr9 are dummy transistors, which are used for adjusting the number of transistors connected between the power supply line VDD and the differential transistors Tr11 and Tr12. The gates of the transistors Tr1 and Tr9 are both grounded.

The transistors Tr3, Tr5, and Tr7 are used to switch the number of paths through which currents are flown into the drain of the differential transistor Tr11; the transistors Tr3, Tr5, and Tr7 may be therefore referred to as the switch transistors Tr3, Tr5 and Tr7, respectively, hereinafter. The gates of the respective switch transistors Tr3, Tr5 and Tr7 are connected to the offset adjustment switch circuit 40. The switch transistors Tr3, Tr5 and Tr7 are switched in response to offset switch signals S2-1 to S2-3 received from the offset adjustment switch circuit 40. The turn-on of the switch transistors Tr3, Tr5 and Tr7 results in that the increase in the number of paths through which currents are flown into the drain of the transistor Tr11, increasing the total amount of the current flown into the drain of the transistor Tr11.

The transistors Tr4, Tr6 and Tr8 are each designed to supply a current of a given current level to the differential transistor Tr11; the transistors Tr4, Tr6 and Tr8 may be therefore referred to as the current regulating transistors Tr4, Tr6 and Tr8. The gates of the current regulating transistors Tr4, Tr6, Tr8 are connected to the drains thereof.

When all of the switch transistors Tr3, Tr5 and Tr7 within the offset control circuit 31 are turned off, the drain of the differential transistor Tr11 is fed with a current from the power supply line VDD to through the transistors Tr1 and Tr2. On the other hand, the drain of the differential transistor Tr12 is fed with a current from the power supply line VDD through the transistors Tr9 and Tr10. Note here that the offset control circuit 31 is configured so that the current level through the differential transistor Tr11 is less than that through the differential transistor Tr12 when all of the switch transistors Tr3, Tr5 and Tr7 are turned off. This allows the comparator 32 to pull up the amplified signal to the high level, when the voltage level on the non-inverting input of the comparator 32 is equal to that on the inverting input of the comparator 32 (such state may be referred to as the no-input state, hereinafter). That is, the offset control circuit 31 is set to have a negative offset value when all of the switch transistors Tr3, Tr5 and Tr7 are placed in the OFF-state.

When the number of switch transistors Tr3, Tr5, Tr7 placed in the ON-state is increased in response to the offset switch signals S2-1 to S2-3, the current level through the differential transistor Tr11 is increased, and the current level through the differential transistor Tr12 is decreased. This leads to the increase in the offset value of the comparator 32. When the number of the ON-state switch transistors is increased up to a certain number, the offset value is changed from negative to positive value and the logic level of the amplified signal in the no-input state is switched from the high-level to the low-level.

Although the offset control circuit 31 is described as including three switch transistors (Tr3, Tr5, Tr7) and three current regulating transistors (Tr4, Tr6, Tr8) in this embodiment, the numbers of the switch transistors and current regulating transistors are not limited to three. The increase in the numbers of switch transistors and current regulating transistors allows reducing the offset adjusting amount for a single switching transistor, thereby providing allows fine offset adjustment of the comparator 32.

Figure 13A:
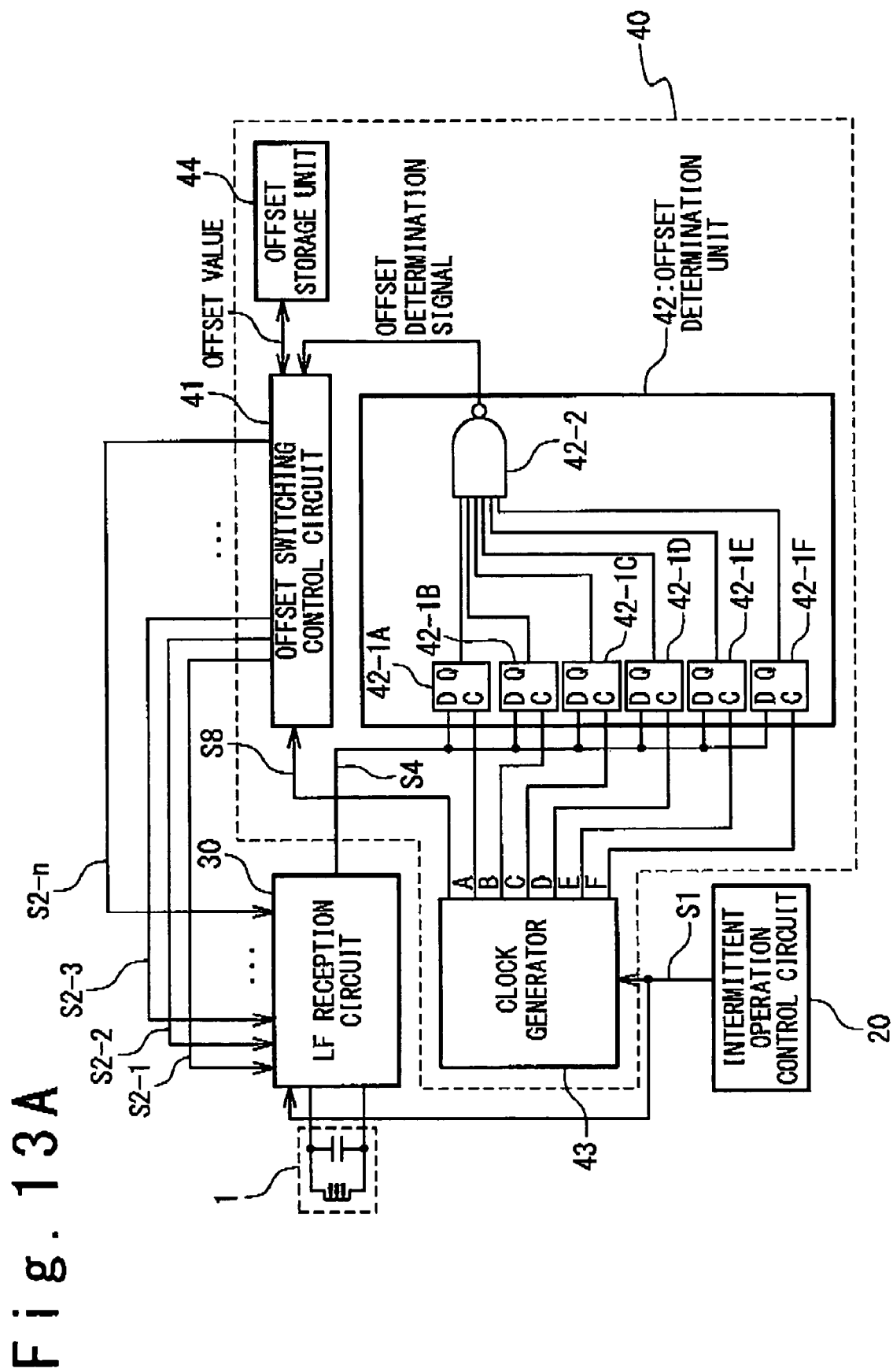
FIG. 13A is a schematic block diagram showing a structure of an offset adjustment changing circuit according to the present invention.

A description is next given of the offset adjustment switch circuit 40 with reference to FIG. 13A. The offset adjustment switch circuit 40 controls the state of the offset control circuit 31. This implies that the offset adjustment control circuit 40 can be considered as a circuit which adjusts the offset value of the comparator 32. The offset adjustment control circuit 40 judges the logic level of the reproduced signal S4, and determines the offset state to be used in the actual operation on the basis of the result of the judgment. The offset adjustment control circuit 40 is connected to the intermittent operation control circuit 20, and starts operating in response to the activation of the intermittent operation signal S1 received from the intermittent operation control circuit 20.

The offset adjustment switch circuit 40 adjusts the state (offset state) of the offset control circuit 31 by feeding the offset switch signals S2-1 to S2-n to the LF reception circuit 30. It should be noted that the LF reception circuit 30 is placed into such the offset state that the offset value of the comparator 32 is negative before the offset adjustment. The offset adjustment switch circuit 40 switches the offset state in such a manner that the offset value is incremented step by step.

The offset adjustment switch circuit 40 judges the logic level of the reproduced signal S4, every when the offset state of the offset control circuit 31 is switched. The offset state in which the logic level of the reproduced signal S4 is just switched from the high-level to the low-level is the state in which the offset value just changes from negative to positive value. The offset value given under this state is the offset value that provides the highest sensitivity. Therefore, the offset adjustment control circuit 40 identifies the offset state for the case when the reproduced signal S4 is switched from the high-level to the low-level, to determine the offset state to be set in actual operations on the basis of the result of the identification. The offset state to be determined is not necessarily the state that provides the offset value of the highest sensitivity. Since noise may influence on the logic level of the reproduced signal S4 when the comparator 32 is set with the highest sensitivity, the offset state that provides lower sensitivity may be determined as the offset state to be used in actual operations.

It should be noted that the offset adjustment switch circuit 40 is desired to judge the logic level of the reproduced signal S4 under the no-input state in order to properly adjust the offset value of the comparator 32. When a voltage is generated between the non-inverting and inverting inputs of the comparator 32 during the reception of the command data, the offset adjustment may be improperly conducted, since the logic level of the reproduced signal S4 may be shifted from the logic level under the no-input state.

In order to address this, the offset adjustment switch circuit 40 of this embodiment judges the logic level of the reproduced signal S4 at multiple timings with the offset state unchanged. The judgments of the logic level of the reproduced signal S4 are conducted at such timings that the logic level is judged in the "low-level" period of each symbol of the command data at least once. This allows judging the logic level of the reproduced signal S4 at least once in the "low-level" period, during which the comparator 32 is virtually in the no-input state. When the logic level of the reproduced signal S4 is judged as the high-level at all the timings at which the judgments are conducted, this implies that the reproduced signal S4 is originally at the high-level in the no-input state. When the logic level of the reproduced signal S4 is judged as the low-level at least once, this implies that the reproduced signal S4 is at the low-level in the no-input state. The offset adjustment switch circuit 40 allows virtually judging the logic level of the reproduced signal S4 in the no-input state and to adjust the offset value on the basis of the judgment, even while the command data are received.

FIG. 12 shows the timings at which the offset adjustment switch circuit 40 judges the reproduced signal S4. When the command data are encoded with the Manchester coding as is the case of this embodiment, a "low-level" period lasts for one cycle period when the symbol is switched from "0" to "1", and a high-level period lasts for one cycle when the symbol is switched from "1" to "0" (see the waveform denoted by (a) in FIG. 12). It should be noted that FIG. 12 assumes that the duration of the high-level period in the reproduced signal S4 is substantially the same as that of the high-level period in the command data; it should be noted that the duration of the high-level period of the reproduced signal S4 may actually vary depending on the damping ratio of the antenna 1 in practical operations. In the case of FIG. 12, the logic level of the reproduced signal S4 is judged in the low-level period at least once when judgments are conducted at timings at which a time period corresponding to two symbols of command data are divided into six or more equal periods (see the arrows denoted by (c) in FIG. 12). It should be noted that judgments conducted at the timings at which a time period corresponding to two symbols of command data are divided into five equal periods may be inappropriate (see the arrows denoted by (b) in FIG. 12); in such a case, the timings may overlap with rising and/or falling edges. Thus, the timings of the judgments are necessary to be defined so as to divide a time period corresponding to two symbols of command data into six or more equal periods, in order to securely conduct the judgments of the logic level of the reproduced signal S4 in a low-level period.

It should be noted that increasing the damping ratio of the antenna 1 by the damping resistance circuit 37 allows extending the low-level period in the input signal S3, as mentioned above. This effectively extends the period corresponding to the low-level period in the reproduced signal S4. The extension of the period corresponding to the low-level period in the reproduced signal S4 is preferable, since it allows reducing the number of judgments of the logic level of the reproduced signal S4.

The above-described offset adjustment switch circuit 40 may be implemented with a structure described below, for example. FIG. 13A is a schematic block diagram showing an exemplary structure of the offset adjustment switch circuit 40.

The offset adjustment switch circuit 40 includes a clock generator 43, an offset determination unit 42, an offset switch signal control circuit 41, and an offset storage unit 44.

The clock generator 43 generates a set of sampling clocks A to F. The sampling clocks A to F are multiphase clock signals indicative of the timings for judging the logic level of the reproduced signal S4. The sampling clocks A to F are high-active signals. The clock generator 43 generates the sampling clocks A to F with phases adjusted to allow judging the logic level at the timings shown in FIG. 12(c). The sampling clocks A to F are supplied to the offset determination unit 42.

In addition, the clock generator 43 feeds an offset switch signal generation clock S8 to the offset switch signal control circuit 41. The offset switch signal generation clock S8 is a clock signal indicating timings to switch the offset switch signals S2-1 to S2-n. The offset switch signal generation clock S8 are activated at given time intervals. The activation intervals of the offset switch signal generation clock S8 is longer than the intervals at with the complete set of the sampling clocks A to F are activated.

The clock generator 43 starts to generate the sampling clocks A to F and the offset switch signal generation clock S8 in response to the activation of the intermittent operation signal S1. It should be noted that the clock generator 43 starts to generate the sampling clocks A to F and the offset switch signal generation clock S8, after a certain waiting time expires for waiting the stabilization of the operation of the LF reception circuit 30. The expiration of the waiting time may be identified by a local clock within the clock generator 43, for example.

The offset determination unit 42 judges the logic level of the reproduced signal S4 in synchronization with the sampling clocks A to F received from the clock generator 43. The offset determination unit 42 includes a set of D latches 42-1A to 42-1F and a NAND circuit 42-2.

The D-latches 42-1A to 42-1F each include a data input terminal (D), a data output terminal (Q), and a clock input terminal (C). Each of the D-latches 42-1A to 42-1F outputs from the data output terminal (Q) an output signal of the same logic level as that of the signal inputted to the data input terminal (D), when the clock input terminal (C) is set to the high-level. When the clock input terminal (C) is set to the low-level, on the other hand, the data transfer is blocked, and the output signal from the data output terminal (Q) remains at the logic level of the output signal outputted when the clock input terminal (C) is pulled down from the high-level to the low-level. The data output from each of the D-latches 42-1A to 42-1F are changeable only when the clock input terminal (C) is pulled up to the high-level.

The data input terminals (D) of the D-latches 42-1A to 42-1F are connected to the LF reception circuit 30 to receive the reproduced signal S4 from the LF reception circuit 30. The clock input terminals (C) of the D-latches 42-1A to 42-1F are connected to the clock generator 43 to receive the sampling clocks A to F, respectively. The data output terminals (Q) of the D-latches 42-1A to 42-1F are connected to the input terminals of the NAND circuit 42. The D-latches 42-1A to 42-1F each hold the logic level of the reproduced signal S4 when the sampling clocks A to F are activated, respectively, and the output signals of the D-latches 42-1A to 42-1F are fed to the NAND circuit 42-2. That is, the timings when the sampling clocks A to F are activated are the timings at which the logic level of the reproduced signal is judged.

The output terminal of the NAND circuit 42-1 is connected to the offset switch signal control circuit 41. The NAND circuit 42-2 generates an offset determination signal in response to the output signals received from the D-latches 42-1A to 42-1F, and supplies the offset determination signal to the offset switch signal control circuit 41. When all the input terminals are set high, the NAND circuit 42-2 pulls down the offset determination signal to the low level. When at least one input terminal is set to the low-level, the NAND circuit 42-2 pulls up the offset determination signal to the high level.

It should be noted that the above-described offset determination unit 42 is composed of only logic circuits. This allows integrating the offset determination unit 42 within a relatively small area.

The offset determination unit 42 thus structured operates as follows. The D-latches 42-1A to 42-1F latch the logic level of the reproduced signal S4 at the timings at which the sampling clocks A to F are activated, respectively, and supply the output signals corresponding to the latched logic level of the reproduced signal S4 to the NAND circuit 42-2. Since the sampling clocks A to F are activated with predetermined time intervals, the D-latches 42-1A to 42-1F latch (or judge) the logic level of the reproduced signal S4 at different timings. When all the D-latches 42-1A to 42-1F latch the reproduced signal S4 of the high level, the NAND circuit 42-2 pulls down the offset determination signal to the low-level. When at least one of the D-latches 42-1A to 42-1F latches the reproduced signal S4 of the low level, on the other hand, the NAND circuit 42-2 pulls up the offset determination signal to the high-level.

The offset switch signal control circuit 41 switches the offset switch signals S2-1 to S2-n. The offset switch signal control circuit 41 is responsive to the offset switch signal generation clock S8 received from the clock generator 43 for switching the logic levels of the offset switch signals S1-1 to S2-n which are supplied to the offset control circuit 31, that is, for switching the offset state of the offset control circuit 31. Specifically, the offset switch signal control circuit 41 increases the number of the offset switch signals S2-1 to S2-n in the active level (that is, the low-level) one by one to increase the number of switch transistors Tr3, Tr5, Tr7 in the ON-state within the offset control circuit 31 one by one. That is, the offset state is switched so that the offset value is increased step by step every when the offset switch signal generation clock S8 is activated.

Further, the offset switch signal control circuit 41 judges the logic level of the offset determination signal when the offset switch signal generation clock S8 is activated, and stores the result of the judgment into the offset storage unit 44, relating the result of the judgment with data indicative of the offset states of the offset control circuit 31 at the timing of the judgment.

Further, the offset switch signal control circuit 41 determines the offset state to be used in the actual operation on the basis of the data stored in the offset storage unit 44, after completing the sequence of switching the logic levels of the offset switch signals S2-1 to S2-n and judging the offset determination signal for all the allowed states of the offset switch signals S2-1 to S2-n. Specifically, the offset switch signal control circuit 41 identifies the offset state when the logic level of the offset determination signal is just switched from the low-level to the high-level, and then determines the offset state to be used in the actual operation on the basis of the identified offset state. Then, the offset switch signal control circuit 41 feeds the offset switch signals S2-1 to S2-n to the offset control circuit 31 to place the offset control circuit 31 into the determined offset state for the actual operation.

FIG. 13B is a conceptual table showing an example of the data stored in the offset storage unit 44. In the example of FIG. 13B, the numbers of the offset switch signals S2-1 to S2-n of the low-level (or the active-level) are described as the data indicating the offset state. In the example of FIG. 13B, the offset determination signal remains at the low-level when only the offset switch signal S2-1 is set to the low-level. The fact that the offset determination signal is set to the low-level implies that the logic level of the reproduced signal S4 in the no-input state is the high-level for the offset state of that time, that is, the offset value is a negative value. On the other hand, the offset determination signal is switched to the high-level, when the offset switch signals from S2-1 and S2-2 are switched to the low-level. The fact that the offset determination signal is set to the high-level implies that the logic level of the reproduced signal S4 in the no-input state is the low-level for the offset state of that time, that is, the offset value is changed to a positive value. In the example of FIG. 13B, the state in which the offset switch signals from S2-1 to S2-2 are set to the active level (or the low level) is identified as the offset state for the case when the logic level of the offset determination signal is switched from the low-level to the high-level.

It should be noted that the offset adjustment switch circuit 40 of this embodiment is one example of possible implementations of this invention, and the offset adjustment switch circuit 40 may be differently structured as long as it achieves the same functions. For example, the offset adjustment switch circuit 40 may be structured to latch the logic level when the reproduced signal S4 of the LF reception circuit 30 is switched to the low-level, for example.

A description is next given of the LF reception allowance signal generation circuit 50 (see FIG. 7). The LF reception allowance signal generation circuit 50 generates an LF reception allowance signal S5 indicative of the completion of the offset value adjustment. The LF reception allowance signal generation circuit 50 activates the LF reception allowance signal S5, which is fed to the interruption generation unit 70, after the offset adjustment of the comparator 32 is completed by the offset adjustment switch circuit 40. The LF reception allowance signal generation circuit 50 may activate the LF reception allowance signal S5 in responsive to the intermittent operation signal S1 after a certain time has passed after the activation of the intermittent operation signal S1. In this case, the LF reception allowance signal generation circuit 50 may be integrated within the intermittent operation control circuit 20 or may be connected to the intermittent operation control circuit 20. Further, the LF reception allowance signal generation circuit 50 may be structured to receive a signal indicating the completion of the adjustment of the offset value from the offset adjustment switch circuit 40, and to activate the LF reception allowance signal S5 in response to this signal. In this case, the offset adjustment switch circuit 40 may be structured to supply the signal indicating completion of the offset adjustment to the LF reception allowance signal generation circuit 50 after the completion of the offset adjustment.

Further, the LF reception allowance signal generation circuit 50 generates a damping resistance control signal S7 in addition to the generation of the LF reception allowance signal S5, and supplies the damping resistance control signal S7 to the LF reception circuit 30. This allows turning off the switch SW1 (see FIG. 10) within the LF reception circuit 30 to reduce the damping ratio of the antenna 1.

A description is next given of the interruption generation unit 70 (see FIG. 7). The interruption generation unit 70 operates to allow starting up the microcomputer 60 when the command data are transmitted after the adjustment of the offset value of the LF reception circuit 30 is completed. The interruption generation unit 70 is connected to the LF reception allowance signal generation circuit 50, the LF reception circuit 30 and the microcomputer 60. The interruption generation unit 70 generates an interruption signal S6 of the same logic level as that of the reproduced signal S4 and supplies the interruption signal S6 to the microcomputer 60, only when the LF reception allowance signal S5 is set to the high-level. The interruption signal S6 remains at the low-level with the reproduced signal S4 set to the low-level, unless the command data are being received, even when the LF reception allowance signal S5 is set to the high level.

A description is next given of the microcomputer 60 (see FIG. 7). The microcomputer 60 includes a CPU (not shown) and a memory (not shown) which are connected to each other through a bus line. The microcomputer 60 is started up when the high-level interruption signal S6 is activated. Then, the microcomputer 60 executes a reproduced command in response to the interruption signal S6. While the command data are not being received, the microcomputer 60 is not started up, because the interruption signal S6 remains at the low-level in that case. This implies that the microcomputer 60 is started up only when the LF reception allowance signal S5 is activated while the command data are being received as well.

Figure 14:
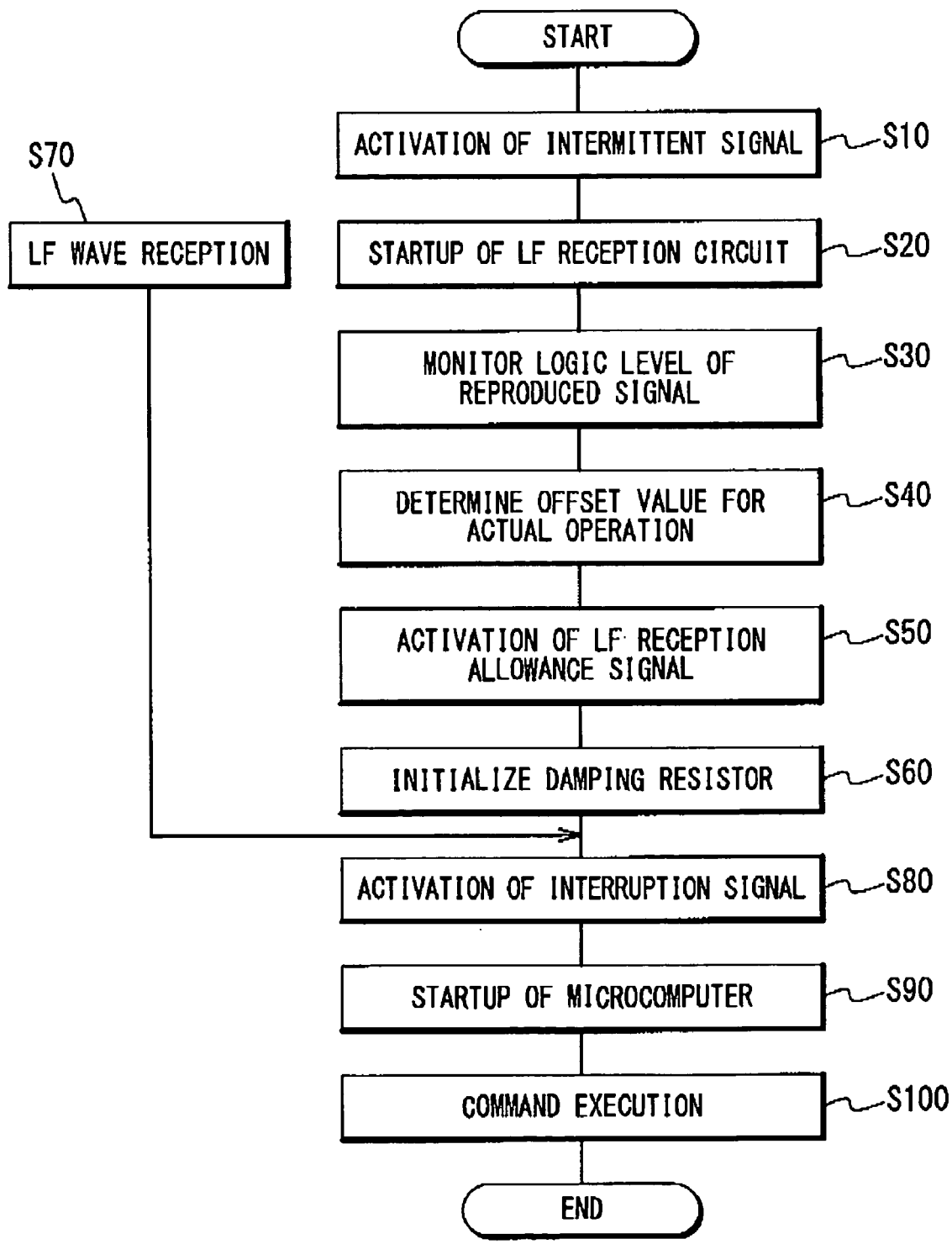
FIG. 14 is a flowchart showing operations of a data receiving apparatus according to the present invention.

In the following, a description is given of operations of the data communication system of this embodiment with reference to FIG. 14. FIG. 14 is a flowchart for describing an entire flow of the operations of the data communication system.

Step S10: Activate Intermittent Operation Signal S1

The intermittent operation control circuit 20 activates the intermittent operation signal S1, which is fed to the LF reception circuit 30 and the offset adjustment switch circuit 40, at a certain timing.

Step S20: Start Up LF Reception Circuit 30

Upon the activation of the intermittent operation signal S1, the LF reception circuit 30 is started up. When the LF reception circuit 30 is started up, the switch SW1 of the damping resistance circuit 37 is set to the ON-state, simultaneously. This allows setting the damping ratio of the antenna 1 to a value adapted to the offset adjustment, to provide increased damping.

Step S30: Monitor Reproduced Signal S4

In the meantime, the offset adjustment switch circuit 40 is also started up in response to the activation of the intermittent operation signal S1. The offset adjustment switch circuit 40 judges the logic level of the reproduced signal S4 at the time after the operation of the LF reception circuit 30 is stabilized. The offset adjustment switch circuit 40 judges the logic level of the reproduced signal S4 while changing the offset state of the LF reception circuit 30.

Step S40: Determine Offset Value for Actual Operation

The offset adjustment switch circuit 40 determines the offset state for the actual operation on the basis of the result of judgments on the reproduced signal S4 implemented at Step S30. Then, the offset adjustment switch circuit 40 sets the offset switch signals S2-1 to S2-n, which are fed to the LF reception circuit 30, so that the offset control circuit 31 are placed in the determined offset state.

Steps S50 and S60: Activate LF Reception Allowance Signal S5 and Damping Resistance Control Signal S7

After Step S40, the LF reception allowance signal generation circuit 50 activates the LF reception allowance signal S5, which is fed to the interruption generation unit 70 at Step S50. Further, the LF reception allowance signal generation circuit 50 activates the damping resistance control signal S7, which is fed to the LF reception circuit 30. This allows setting the switch SW1 to the OFF-state, so that the damping ratio is set to an initial value to provide reduced damping.

Step S70: Receive LF Radio Wave

When the antenna 1 receives the LF radio wave incorporating the command data after Step S60, the input signal S3 is generated by the antenna 1 and fed to the LF reception circuit 30. In the LF reception circuit 30, the input signal S3 is deferentially amplified by the comparator 32, and the amplified signal is outputted from the comparator 32. The amplified signal is demodulated by the demodulator 34 to reproduce the reproduced signal S4. The reproduced signal S4 is supplied to the interruption generation unit 70 from the LF reception circuit 30.

Step S80: Activate Interruption Signal S6

The interruption generation unit 70 then activates the interruption signal S6, which is fed to the microcomputer 60.

Step S90: Start Up Microcomputer

When the interruption signal S6 is activated, the microcomputer 60 is started up.

Step S100: Execute Command

The microcomputer 60 then executes the command in response to the interruption signal S6. The microcomputer 60 virtually executes the command in response to the reproduced signal S4, since the interruption signal S6 is supplied with the same logic level as that of the reproduced signal S4.

An operation sequence in a single intermittent operation is completed, by going through Steps S10 to S100. That is, a single intermittent operation involves first adjusting the offset value at Steps S10 to S40, and then starting up the microcomputer 60 followed by executing commands described in the command data only when the command data are transmitted, at Steps S70-S100.

It should be noted that the microcomputer 60 is started up only when the command data are transmitted after the adjustment of the offset value is completed. This allows reducing the time duration during which the microcomputer 60 operates to the necessary minimum duration. Further, the microcomputer 60 is started up during the adjustment of the offset value. In the TPMS disclosed in the '105 application, the offset value is adjusted through starting up the microcomputer and executing the program of the microcomputer. In contrast, the system of this embodiment effectively reduces the power consumed by the microcomputer compared to the case in which the microcomputer conducts the offset adjustment.

In the system of this embodiment, the offset value is adjusted in every intermittent operation. In the TPMS system disclosed in the '105 application, the offset value may be inappropriately set when the adjustment of the offset value is conducted in receiving radio wave. The data communication system disclosed in the '105 application requires conducting the adjustment under a state in which no radio wave is received in order to set the offset value accurately. During the operation of the data communication system the command data may be transmitted irregularly, and therefore the state in which the data communication system is operated cannot be considered as a state in which no radio wave is received. The data communication system disclosed in the '105 application requires adjusting the offset value in advance before actually operating the data communication system. However, the desired offset value may vary due to changes in the use conditions (such as the operation temperature, and the supply voltage). Thus, the data communication system disclosed in the '105 application requires reducing the sensitivity of the comparator for addressing such variations in the offset value due to changes in the used conditions. In contrast, the data communication system of this embodiment, in which the offset value is adjusted in every intermittent operation, continuously offers an optimized offset value, regardless of the changes in the use conditions.

Figure 15:
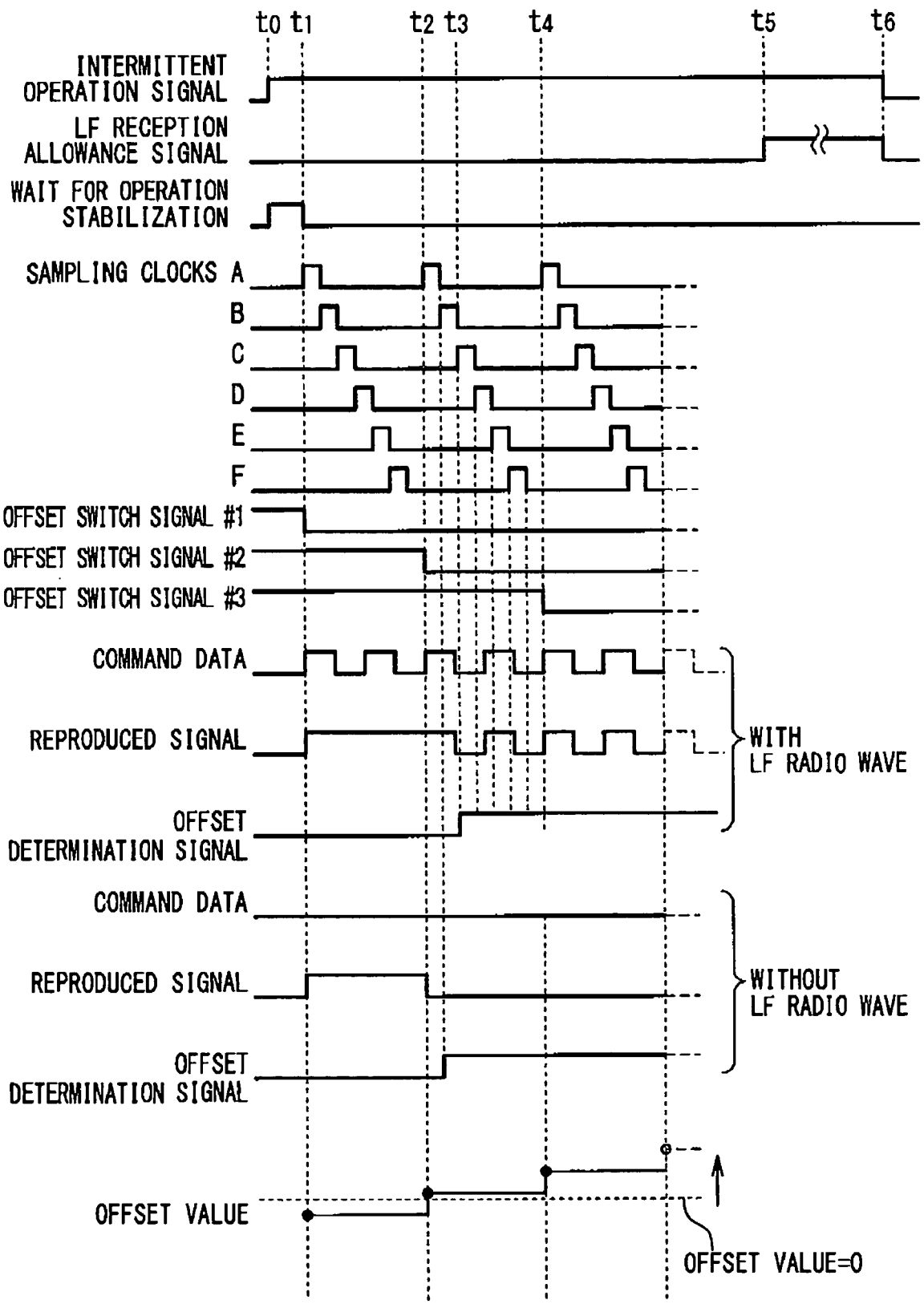
FIG. 15 is a timing chart showing the operations of the data receiving apparatus according to the present invention.
Figure 16:
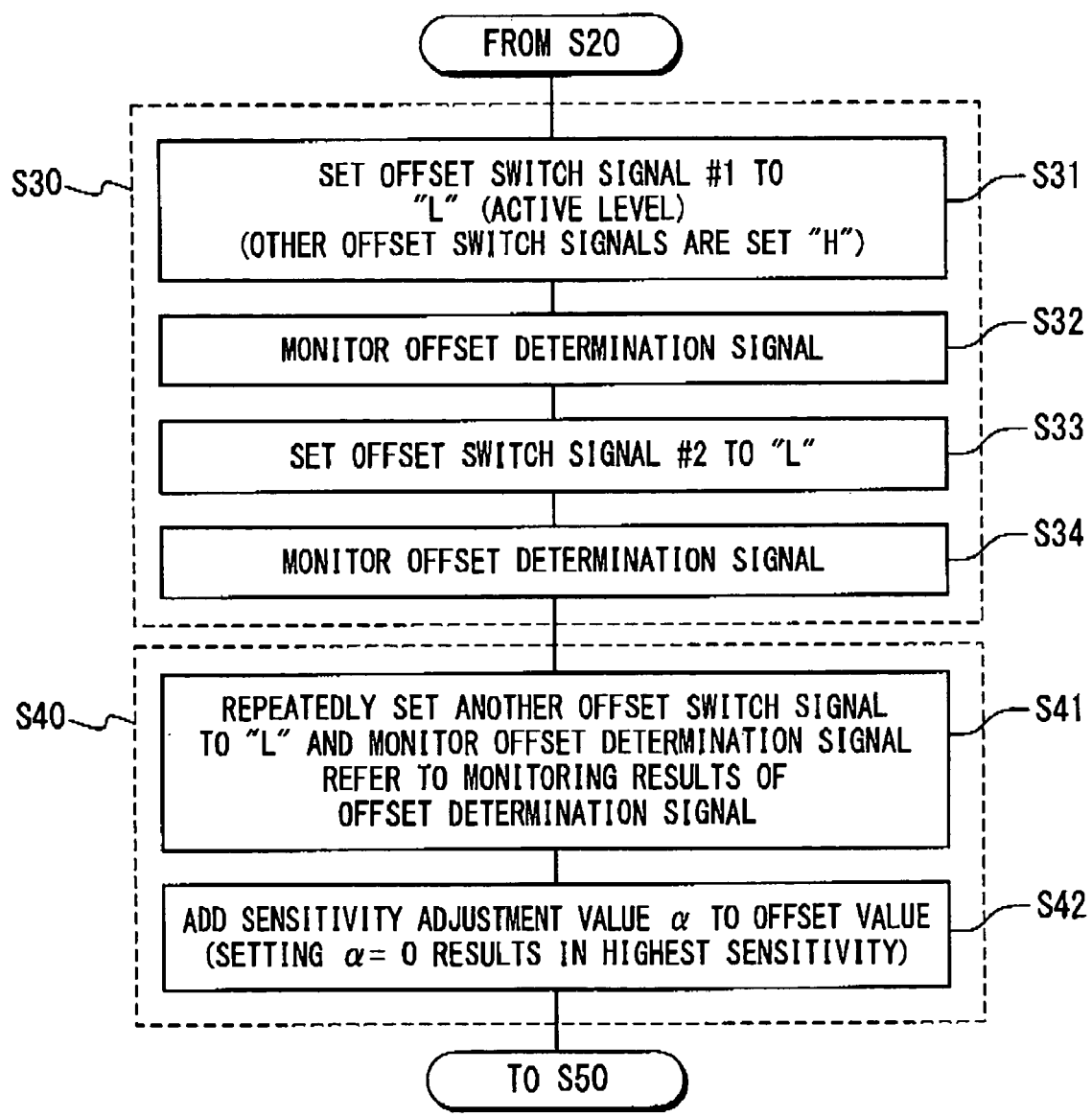
FIG. 16 is a flowchart showing operations of the offset adjustment switch circuit according to the present invention.

A detailed description is next given of the operations of Steps S30 and S40 mentioned above. FIG. 15 is a timing chart illustrating the operations of the offset adjustment switch circuit 40, and FIG. 16 is a flowchart illustrating the operations of Steps S30 and S40 in details.

As shown in FIG. 15, the intermittent operation signal S1, fed from the intermittent operation control circuit 20, is activated at the time t0. Upon the activation of the intermittent operation signal S1, the clock generator 43 within the offset adjustment switch circuit 40 counts the stabling time for the LF reception circuit 30. In FIG. 15, the time t1 is the time at which the stabling time for the LF reception circuit 30 expires. The offset value is so set in advance that the output of the LF reception circuit 30 is set to the high level; the LF reception circuit 30 sets the reproduced signal S4 to the high level at the time t1.

Step S31: Switch Offset Changing Signal S2-1

At the time t1, the offset switch signal control circuit 41 switches the offset switch signal S2-1 to the low-level (the active level) in response to the activation of the offset switch signal generation clock S8 (not shown in FIG. 15). As a result, the current level of the current fed to the drain of the differential transistor Tr11 in the comparator 32 of the LF reception circuit 30 is increased by one predetermined step. That is, the offset state is switched so that the offset value is increased by one predetermined step. It should be noted, however, the current through the differential transistor Tr12 is assumed as being still larger than the current through the differential transistor Tr11, and the offset value is a negative value.

Step S32: Monitor Offset Determination Signal

After the time t1, the clock generator 43 starts to feed the sampling clocks A to F to the offset determination unit 42. The clock generator 43 activates the sampling clocks A to F at different timings. The offset determination unit 42 monitors the logic level of the reproduced signal S4 at the timings when the respective sampling clocks are activated.

In the following description, command data of all 0 (a sequence of symbols "0000 . . . ") are encoded with the Manchester coding and transmitted (see the waveforms indicated by "with LF radio wave" in FIG. 15). In this case, the LF reception circuit 30 already sets the output thereof to the high-level in the no-input state, so that the logic levels of the reproduced signal S4 corresponding to the low-level periods of the command data are set to the high-level, accordingly. That is, the reproduced signal S4 is continuously set to the high-level. Therefore, all the D-latches 42-1A to 42-1E within in the offset determination unit 42 set the output signals to the high level, and feeds the output signals to the NAND circuit 42-2. This results in that the offset determination signal, which is fed to the offset switch signal control circuit 41, is continuously set to the low level.

When the LF reception circuit 30 is in the no-input state (see the waveforms indicated by "without LF radio wave" in FIG. 15), the reproduced signal 4 remains at the high-level. Therefore, the offset determination signal, fed to the offset switch signal control circuit 41, is continuously set to the low level.

The offset switch signal control circuit 41 judges the logic level of the offset determination signal after all of the sampling clocks A-E are activated once. Then, the offset switch signal control circuit 41 stores the judgment result to the offset storage unit 44.

Step S33: Switch Offset Switch Signal S2-2

When the procedure of Step S32 is completed, the offset switch signal generation clock S8 (not shown) is activated again, and the offset switch signal control circuit 41 switches the offset switch signal S2-2 to the low-level. In the operation of FIG. 15, the offset switch signal S2-2 is switched to the low-level at the time t2. When the offset switch signal S2-2 is switched to the low-level, the current fed to the differential transistor Tr11 is increased further by one step. That is, the offset state is switched so that the offset value is increased further by one step. In the operation of FIG. 15, the switching of the offset switch signal S2-2 to the low-level causes the offset value to be increased to a positive value. Here, the LF reception circuit 30 is placed into such a state that the reproduced signal S4 generated by the LF reception circuit 30 is set to the low-level in the no-input state.

Step S34: Monitor Offset Determination Signal

At the time t2, the clock generator 43 starts sequentially activating the sampling clocks A to F, which are fed to the offset determination unit 42, once more.

When the command data are being received (see "with LF radio wave"), the reproduced signal S4 is repeatedly switched between the high-level and the low-level. It should be noted that at least one of the sampling clocks A to F, which are fed to the D-latches 42-1A to 42-1F of the offset determination unit 42, is activated at the timings so that the reproduced signal S4 is monitored in a low-level period incorporated in the command data. Therefore, at least one of the D-latches 42-1A to 42-1F latches the reproduced signal S4 when the reproduced signal S4 is set to the low-level. In an example shown in FIG. 15, the reproduced signal S4 is switched to the low-level at the time t3 which corresponds to the falling edge of the sampling clock B. Thus, the D-latch 43-1B latches the reproduced signal S4 when the reproduced signal S4 is set to the low level, and supplies the output signal of the low level to the NAND circuit 42-2. As a result, the offset determination signal is switched from the low-level to the high-level at the time t3.

For the case when the command data are not being received (see the waveforms indicated by "without LF radio wave" in FIG. 15), the D-latch 42-1A latches the low-level in response to the falling edge of the sampling clock A. As a result, the offset determination signal is switched to the high-level as is the case where the command data are being received.

The offset switch signal control circuit 41 judges the logic level of the offset determination signal after all of the sampling clocks A-E are activated once. Then, the offset switch signal control circuit 41 stores the judgment result into the offset storage unit 44.

After completing the judgments of the reproduced signal S4 with the offset switch signal S2-2 set to the low-level, the offset switch signal control circuit 41 further switches the offset switch signals S2-3 to the low-level at the time t4. Then, the offset determination unit 42 judges the logic level of the reproduced signal S4 as in the same manner performed between the time t1 and the time t2, and between the time t2 and the time t4.

Step S41: Refer to Judgment Result

The offset switch signal control circuit 41 performs the same procedure for the remaining offset switch signals S2-3 to S2-n. The offset switch signal control circuit 41 switches the offset switch signal S2-3 to the low-level, and judges the offset determination signal in that state. The judgment result is stored in the offset storage unit 44. The same goes for other offset switch signals. Then, the offset switch signal control circuit 41 refers to the offset storage unit 44 to identify the offset switch signal S2-1 which causes the switching of the offset determination signal from the low-level to the high-level.

Step S42: Adjust Sensitivity

The offset switch signal control circuit 41 determines the offset state for the actual operation on the basis of the identification result obtained at Step S41. Specifically, the offset switch signal control circuit 41 determines the offset state for the actual operation so that the offset value set for the actual operation is higher by a given sensitivity adjustment value $\alpha$ than that in the offset state identified at Step S41. Then, the offset switch signal control circuit 41 set the offset switch signals S2-1 to S2-n accordingly to provide the desired offset state. The sensitivity adjustment value $\alpha$ is a value set in advance. When the sensitivity adjustment value $\alpha$ is zero, the sensitivity is the highest. It is preferable that the sensitivity adjustment value $\alpha$ is set appropriately depending on the purpose and usage of the data receiving apparatus 11.

At the time t5, which is later than the time when the offset adjustment by the offset switch signal control circuit 41 is completed, the LF reception allowance signal generation circuit 50 activates the LF reception allowance signal S5, which is fed to the interruption generation unit 70. Further, the LF reception allowance signal generation circuit 50 deactivates the damping resistance control signal S7 to instruct the LF reception circuit 30 to decrease the damping ratio. The LF reception allowance signal S5 is activated until the time t6, at which the intermittent operation signal S2 is deactivated. When the command data are received during the period from the time t5 to the time t6, the microcomputer 60 is started up as described above, the command data are reproduced by the LF reception circuit 30, and the reproduced commands are executed by the microcomputer 60. When no command data are received during the period from the time t5 to the time t6, the processing is completed without stating up the microcomputer 60.

As described above, the offset judgment changing circuit 40 judges the logic level of the reproduced signal S4 of the LF reception circuit 30 at multiple timings with the offset state kept constant, in this embodiment. As a result, the logic level of the reproduced signal S4 is judged in the low-level period of the command data at least once even while the command data are being received. This allows determining the offset value on the basis of the logic level of the reproduced signal S4 in the no-input state. Even if the offset adjustment is conducted while receiving the command data, the offset value is not shifted from the optimum value due to the generation of the input signal S3 by the received radio wave. Thus, the offset adjustment can be conducted accurately.

Figure 17:
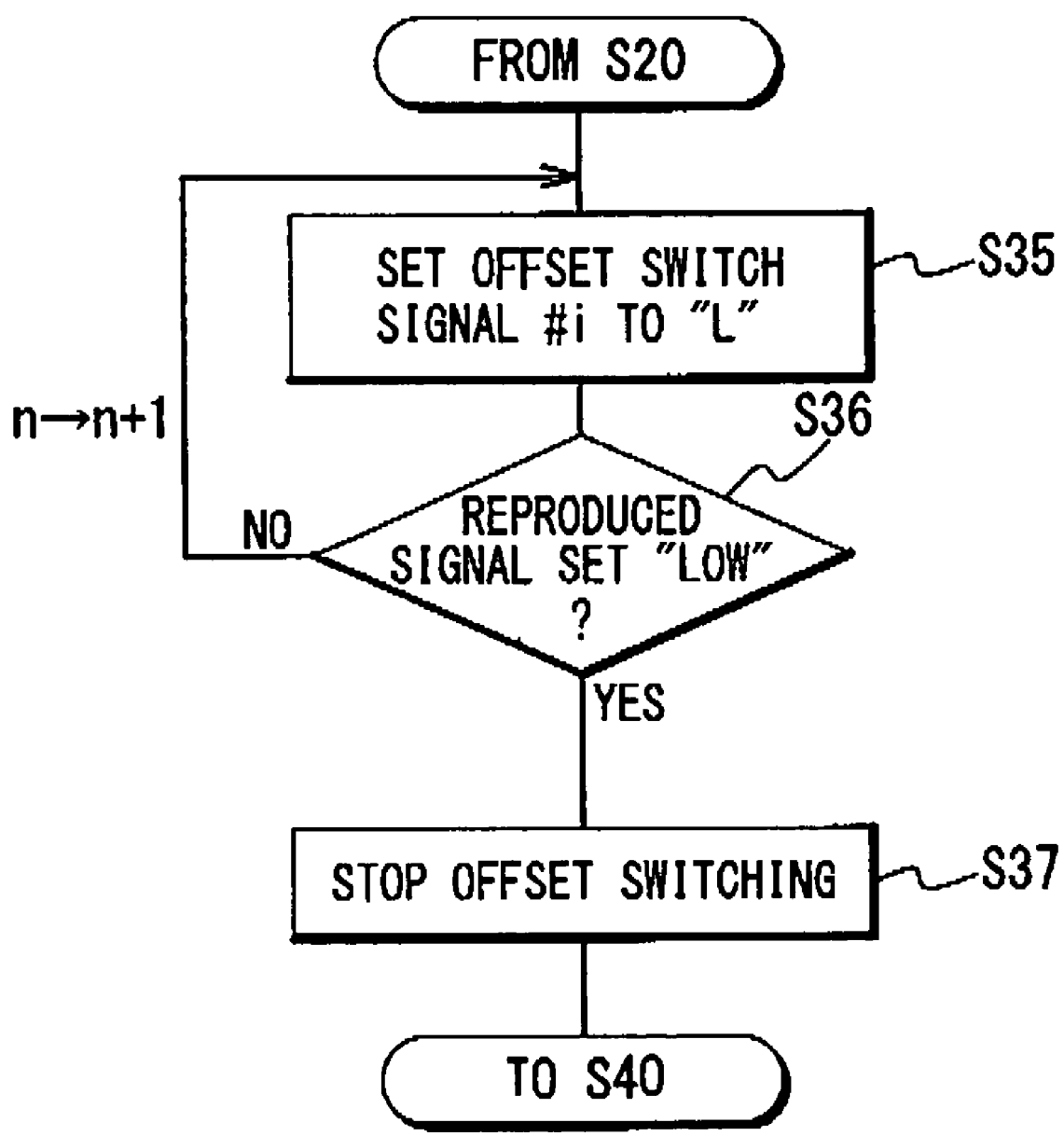
FIG. 17 is a flowchart showing modified operations of the offset adjustment switch circuit.

Although this embodiment is described for a case where the offset switch signal control circuit 41 successively switches all the offset switch signals S2-1 to S2-n and judges the offset determination signal for every stitching of the offset switch signals at Step S30, the person skilled in the art would appreciate that it is not essential to switch all the offset switch signals S2-1 to S2-2. For example, the offset changing signal control circuit may operate as shown in FIG. 17. In the example shown in FIG. 17, the i-th offset switch signal S2-i is switched to the active level (that is, the low-level) at Step S35. Then, the logic level of the reproduced signal S4 in the no-input state is judged at Step S36. When the reproduced signal S4 is not judged as the low level in any of the multiple judgments, an (i+1)-th offset switch signal is switched to the active level "L". When the reproduced signal S4 is judged as the low level at least once, on the other hand, the offset switching operation is completed at Step S37. With this operation, it is also possible to identify the step at which the logic level of the reproduced signal S4 for the no-input state is switched from the high-level to the low-level.

It is apparent that the present invention is not limited to the above embodiments, but may be modified and changed without departing from the scope of the invention.

What is claimed is:

1. A data receiving apparatus for receiving command data encoded by using a combination of high-level periods during which there is radio wave and low-level periods during which there is no radio wave, said data receiving apparatus comprising:

a receiving circuit including a differential amplifier circuit receiving said command data through an antenna, and a demodulator outputting a reproduced signal corresponding to said command data in response to an output of said differential amplifier; and an offset adjustment switch circuit judging a logic level of said reproduced signal in said low level periods of said command data using a plurality of logic circuits while said receiving circuit receives said command data, and generates offset switch signals based on said logic level of said reproduced signal in said low level periods, wherein said differential amplifier circuit includes an offset control section adjusting an offset value of said differential amplifier circuit in response to said offset switch signals, wherein said plurality of logic circuits includes:

a timing signal generator that generates a plurality of timing signals, wherein each of said plurality of timing signals is generated at a different time;

a plurality of data latches that each latch said reproduced signal in response to one of said plurality of timing signals;

an offset determination unit that generates an offset determination signal in response to output signals received from said plurality of data latches; and an offset switch signal control circuit that receives said offset determination signal to generate said offset switch signals.

2. The data receiving apparatus according to claim 1, wherein said command data are encoded so that each symbol of said command data includes at least one of said low level periods, and wherein said offset adjustment switch circuit judges said logic level of said reproduced signal multiple times with said offset value kept constant, so that said logic level of said reproduced signal is judged in at least one of said low-level periods during reception of said command data.

3. The data receiving apparatus according to claim 1, wherein said offset value of said differential amplifier circuit is set so that said logic level of said reproduced signal is a high level for said low-level periods before adjustment of said offset value, wherein said offset adjustment switch circuit generates said offset switch signals so that said offset value is switched step by step, wherein said offset adjustment switch circuit identifies a step at which said logic level of said reproduced signal in said low-level periods is switched from the high level to a low level, and wherein said offset adjustment switch circuit determines desired states of said offset switch signals for an actual operation based on a result of the identification.

4. The data receiving apparatus according to claim 1, further comprising:

an intermittent operation control circuit supplying an intermittent operation signal to said receiving circuit, wherein said command data are transmitted repeatedly in a command data transmission period, wherein said intermittent operation control circuit activates said intermittent operation signal with a cycle period shorter than said command data transmission period, and wherein said receiving circuit is started up in response to activation of said intermittent operation signal.

5. The data receiving apparatus according to claim 4, wherein said intermittent operation signal is also supplied to said offset adjustment switch circuit, and wherein said offset adjustment switch circuit is activated in response to said activation of said intermittent operation signal.

6. The data receiving apparatus according to claim 1, further comprising:

a reception allowance signal generation circuit activating a reception allowance signal after said offset value is set to a value determined for an actual operation;

an interruption generation section receiving said reception allowance signal and said reproduced signal; and a microcomputer executing a command incorporated in said reproduced signal, wherein said interruption generation section activates an interruption signal fed to said microcomputer when said reception allowance signal is activated and said reproduced signal is set to the high level, and wherein said microcomputer is started up in response to activation of said interruption signal.

7. The data receiving apparatus according to claim 1, wherein said antenna includes an LC resonance antenna including a coil and capacitor, wherein two inputs of said differential amplifier circuit are connected to terminals of said LC resonance antenna, respectively.

8. The data receiving apparatus according to claim 7, further comprising a damping resistor circuit adjusting a damping ratio of said antenna, and wherein said damping ratio set during adjustment of said offset value is larger than said damping ratio set in an actual operation.

9. A data communication system comprising:

a data transmitting apparatus transmitting command data encoded by using a combination of high-level periods during which there is radio wave and low-level periods during which there is no radio wave; and a data receiving apparatus comprising:

a receiving circuit including a differential amplifier circuit receiving said command data through an antenna, and a demodulator outputting a reproduced signal corresponding to said command data in response to an output of said differential amplifier; and an offset adjustment switch circuit judging a logic level of said reproduced signal in said low level periods of said command data using a plurality of logic circuits while said receiving circuit receives said command data, and generates offset switch signals based on said logic level of said reproduced signal in said low level periods, wherein said differential amplifier circuit includes an offset control section adjusting an offset value of said differential amplifier circuit in response to said offset switch signals, wherein said plurality of logic circuits includes:

a timing signal generator that generates a plurality of timing signals, wherein each of said plurality of timing signals is generated at a different time;

a plurality of data latches that each latch said reproduced signal in response to one of said plurality of timing signals;

an offset determination unit that generates an offset determination signal in response to output signals received from said plurality of data latches; and an offset switch signal control circuit that receives said offset determination signal to generate said offset switch signals.

10. The data communication system according to claim 9, wherein said data receiving apparatus is provided in a tire wheel of a vehicle, and wherein said data transmitting apparatus is provided on said vehicle outside said tire wheel.

11. An offset adjustment method comprising:

receiving command data through an antenna by a receiving circuit, said command data being encoded by using a combination of high-level periods during which there is radio wave and low-level periods during which there is no radio wave;

reproducing said received command data by said receiving circuit to output a reproduced signal; and adjusting an offset value of a differential amplifier circuit within said receiving circuit, wherein said adjusting includes:

judging a logic level of said reproduced signal in said low level periods of said command data using a plurality of logic circuits while said receiving circuit receives said command data; and determining said offset value of said differential amplifier circuit based on a result of said judging, wherein said plurality of logic circuits includes:

a timing signal generator that generates a plurality of timing signals, wherein each of said plurality of timing signals is generated at a different time;

a plurality of data latches that each latch said reproduced signal in response to one of said plurality of timing signals;

an offset determination unit that generates an offset determination signal in response to output signals received from said plurality of data latches; and an offset switch signal control circuit that receives said offset determination signal to generate a plurality of offset switch signals, and wherein said offset value of said differential amplifier circuit is determined in response to said plurality of offset switch signals.

12. The offset adjustment method according to claim 11, wherein said receiving circuit includes:

a differential amplifier circuit connected to said antenna; and an offset control circuit configured to adjust said offset value of said differential amplifier circuit, wherein said adjusting said offset value includes adjusting a state of said offset control circuit.

13. The offset adjustment method according to claim 11, wherein said command data are encoded so that each symbol of said command data includes at least one of said low level periods, and wherein said judging of said logic level of said reproduced signal includes judging said logic level of said reproduced signal multiple times with said offset value kept constant, so that said logic level of said reproduced signal is judged in at least one of said low-level periods during reception of said command data.

14. The offset adjustment method according to claim 13, further comprising:

setting said offset value of said differential amplifier circuit before adjustment of said offset value, so that said logic level of said reproduced signal is a high level for said low-level periods, wherein said judging of said logic level of said reproduced signal further includes:

switching said offset value; and judging said logic level of said reproduced signal in said low-level periods every when said offset value is switched, and wherein said determining said offset value of said differential amplifier circuit includes:

identifying said offset value at which said logic level of said reproduced signal in said low-level periods is switched from the high level to a low level, and determining said offset value for an actual operation based on said identified offset value.

15. The offset adjustment method according to claim 11, further comprising:

repeatedly transmitting said command data in a command data transmission period;

generating an intermittent operation signal; and starting up said receiving circuit in response to activation of said intermittent operation signal, wherein said intermittent operation signal is activated with a cycle period shorter than said command data transmission period.

16. The offset adjustment method according to claim 15, wherein said offset value of said differential amplifier circuit is adjusted every when said intermittent operation signal is activated.

17. The offset adjustment method according to claim 11, further comprising:

activating a reception allowance signal after said offset value of said differential amplifier circuit is adjusted; and executing a command incorporated within said command data in response to said reproduced signal after a time when said reception allowance signal is activated with said reproduced signal set to the high level.

18. The offset adjustment method according to claim 11, wherein, in adjusting said offset value of said differential amplifier circuit, a damping ratio of said antenna is set to a value larger than that of said damping ratio for an actual operation.

19. The offset adjustment method according to claim 18, further comprising:

setting said damping ratio to a value of said damping ratio for said actual operation, after adjusting said offset value of said differential amplifier circuit.

* * * * *